United States Patent
Yamazoe et al.

(10) Patent No.: US 7,038,810 B1
(45) Date of Patent: May 2, 2006

(54) IMAGE PROCESSING METHOD AND APPARATUS, IMAGE PROCESSING SYSTEM, AND STORAGE MEDIUM

(75) Inventors: Manabu Yamazoe, Kawasaki (JP); Yasutomo Suzuki, Tokyo (JP); Katsuhiko Anzai, Tokyo (JP); Koji Nagata, Yokohama (JP); Takayuki Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/459,479

(22) Filed: Dec. 13, 1999

(30) Foreign Application Priority Data

Dec. 14, 1998 (JP) .......................... 10-355256
Jul. 2, 1999 (JP) .......................... 11-189637

(51) Int. Cl.
*H04N 1/407* (2006.01)
*H04N 1/409* (2006.01)
*H04N 1/58* (2006.01)
*G06T 5/00* (2006.01)
*G06T 5/40* (2006.01)

(52) U.S. Cl. ................ 358/1.9; 358/3.21; 358/3.27; 358/537; 358/452; 382/168; 382/261

(58) Field of Classification Search ........... 358/1.9, 358/3.01, 3.21, 3.27, 537, 452; 382/254, 382/260, 261, 266, 168, 274
See application file for complete search history.

(56) References Cited

U.S. PATENT DOCUMENTS

| | | | |
|---|---|---|---|
| 4,485,397 A | 11/1984 | Scheuter et al. | 382/199 |
| 4,772,958 A | 9/1988 | Suzuki | 358/294 |
| 4,817,174 A * | 3/1989 | Nakatani | 382/266 |
| 4,825,295 A | 4/1989 | Ishikawa et al. | 358/254 |
| 4,835,404 A | 5/1989 | Sugawa et al. | 250/578 |

(Continued)

FOREIGN PATENT DOCUMENTS

| | | |
|---|---|---|
| EP | 0 678 831 | 10/1995 |
| EP | 0 712 093 | 5/1996 |
| JP | 1-314389 | 12/1989 |
| JP | 3-91087 | 4/1991 |
| JP | 3-91088 | 4/1991 |

(Continued)

OTHER PUBLICATIONS

Landing, "New Photoshop f/x," vol. 1. Sep. 1, 1998 pp. 491–492, 551–557 Kabushiki Kaisha Exceed Press.

(Continued)

*Primary Examiner*—Scott A. Rogers
(74) *Attorney, Agent, or Firm*—Fitzpatrick, Cella, Harper & Scinto

(57) ABSTRACT

In general, it is difficult for the end user to implement a simulate illustration process for an image, since manual setups of the process are complicated and require skills. Also, there is room for improvement in terms of image quality. In this invention, the luminance histogram of an original image is generated, the brightness of that image is detected based on the histogram, and the image undergoes a filter process corresponding to the detected brightness, thus easily performing the simulate illustration process using bright tone for the image. Especially, since a filter is set for rasterized image data in correspondence with the number of lines of the data to be processed, an effective simulate illustration process can be implemented.

50 Claims, 28 Drawing Sheets

(10 of 28 Drawing Sheet(s) Filed in Color)

U.S. PATENT DOCUMENTS

| | | | |
|---|---|---|---|
| 4,914,519 A | 4/1990 | Hashimoto et al. | 348/241 |
| 4,922,335 A | 5/1990 | Outa et al. | 358/506 |
| 4,969,053 A | 11/1990 | Outa et al. | 348/104 |
| 4,972,243 A | 11/1990 | Sugawa et al. | 357/30 |
| 5,038,223 A | 8/1991 | Yamada | 358/445 |
| 5,053,896 A | 10/1991 | Sakata et al. | 360/71 |
| 5,101,440 A * | 3/1992 | Watanabe et al. | 382/168 |
| 5,126,838 A | 6/1992 | Ohsawa et al. | 358/500 |
| RE34,309 E | 7/1993 | Tanaka et al. | |
| 5,245,432 A | 9/1993 | Jaffray et al. | |
| 5,254,847 A | 10/1993 | Hata et al. | 250/208.1 |
| 5,276,581 A | 1/1994 | Sakata et al. | 360/137 |
| 5,489,995 A | 2/1996 | Iso et al. | 358/483 |
| 5,675,664 A * | 10/1997 | Maeda et al. | 382/199 |
| 5,684,600 A | 11/1997 | Miyazaki et al. | 358/3.24 |
| 5,802,217 A | 9/1998 | Suzuki et al. | 382/274 |
| 5,949,556 A | 9/1999 | Tamai | |
| 6,088,487 A * | 7/2000 | Kurashige | 382/266 |
| 6,219,459 B1 * | 4/2001 | Kurashige | 382/266 |
| 6,798,906 B1 * | 9/2004 | Kato | 382/199 |
| 2004/0184057 A1 * | 9/2004 | Nakabayshi et al. | 358/1.9 |

FOREIGN PATENT DOCUMENTS

| | | |
|---|---|---|
| JP | 3091087 | 4/1991 |
| JP | 3091088 | 4/1991 |
| JP | 5-094523 | 4/1993 |
| JP | A5-344345 A | 12/1993 |
| JP | A7-114638 A | 5/1995 |
| JP | 7-121702 | 5/1995 |
| JP | A8-88775 A | 4/1996 |
| JP | 8-181865 | 7/1996 |
| JP | A8-195888 A | 7/1996 |
| JP | 10-134178 | 5/1998 |
| JP | A10304184 A | 11/1998 |
| WO | WO 92/20184 | 11/1992 |

OTHER PUBLICATIONS

W.K. Pratt, "Digital Image Processing," 1991 Wiley–Interscience, (XP–002245131).

A.K. Jain, "Fundamentals of Digital Image Processing," 1989 Prentice Hall, (XP–0022245132).

Article entitled "New Photoshop, f/X", from "An Action To Make An Image Sepia Toned" with English translation of relevant pages and Applicant's comments re same.

Copies of Office Actions dated Mar. 12, 2004 and Apr. 19, 2004, which issued in Japanese counterpart application Nos. 11–189637 and 10–35526, respectively, with Applicant's comments re same.

* cited by examiner

FIG. 5

| | | | | |
|---|---|---|---|---|
| −1 | −1 | −1 | −1 | −1 |
| −1 | −1 | −1 | −1 | −1 |
| −1 | −1 | 26 | −1 | −1 |
| −1 | −1 | −1 | −1 | −1 |
| −1 | −1 | −1 | −1 | −1 |

| -1 | -1 | -1 |
|----|----|----|
| -1 | 10 | -1 |
| -1 | -1 | -1 |

FIG. 18A

| -8 | -4 | P | -4 | -8 |
|----|----|---|----|----|

FIG. 18B

| -4 | -1 | P  | -1 | -4 |
|----|----|----|----|----|
| -4 | -1 | -1 | -1 | -4 |

IMAGE PROCESSING METHOD AND APPARATUS, IMAGE PROCESSING SYSTEM, AND STORAGE MEDIUM

BACKGROUND OF THE INVENTION

This invention relates to an image processing method, apparatus, and system for modifying an original image, and a storage medium.

As digital cameras, photoscanners, and the like have prevailed in recent years, a photo image can be easily converted into digital data. Also, since output apparatuses represented by ink-jet printers have attained higher image quality and lower prices, the end user can easily output a photo onto a recording sheet at home.

Hence, with an apparatus such as a personal computer or the like that allows image processing, the end user edits an image sensed by, e.g., a digital camera as he or she so desires, and outputs the edit result via an ink-jet printer.

A process called posterization has been proposed as Japanese Patent Laid-Open No. 1-314389, and an illustration edit process has been proposed as Japanese Patent Laid-Open Nos. 3-91088 and 3-91087.

As the personal computer and printer that can implement an edit process of a digital photo image have higher performance and lower prices, for example, the end user can easily create name cards having his or her own face photo superimposed on them.

Also, a machine that can print photo stickers of a sensed image at that place has prevailed.

A case will be examined below wherein a photo is superimposed on a name card. Upon creating formal name cards, it is a common practice to superimpose an expressionless face photo. However, as such name cards sometimes produce stiffness, informal name cards are often required. In such case, the need for superimposing not only a face photo that the user desired but a more personalized photo created by editing the photo itself has arisen. As an edit process that meets such need, a monochrome edit process represented by sepia-tone conversion, an edit process for converting a photo into an illustration, and the like are known.

In this manner, various needs for photo images have increased recently.

However, in the conventional image processing apparatus, in order to edit a photo image to obtain an illustration-style image, the edges of the photo image are extracted and individual portions are painted in the same colors as those in the original image. Furthermore, the user must finely set various parameters required for edge extraction, painting, and the like.

Hence, in order to obtain an illustration-style image, room for improvement still remains in terms of image quality. Also, not only complicated setups but also considerable user skills are required to obtain appropriate setups. Hence, it is difficult for the end user to attain such setups.

SUMMARY OF THE INVENTION

Accordingly, it is an object of the present invention to provide an image processing method, apparatus, and system which can easily perform an effective simulate illustration process for image data, and a storage medium.

According the present invention, the foregoing object is attained by providing an image processing method comprising: the modify step of modifying a first image to obtain a second image on the basis of a first signal obtained by extracting an edge of the first image, and a second signal obtained by reducing the number of tone levels.

It is another object of the present invention to provide an image processing method, apparatus, and system which allows the user to easily set up details of simulate illustration process, and a storage medium.

According the present invention, the foregoing object is attained by providing an image processing method further comprising: the instruction input step of inputting a user instruction that selects a desired one of a plurality of modify modes; and the image process step of executing an image process for image data using the modify mode corresponding to the user instruction, and wherein the plurality of modify modes include an illustration mode for converting the first image into the second image in the modify step.

It is another object of the present invention to provide an image processing method, apparatus, and system which can easily perform an effective simulate illustration process even for rasterized image data, and a storage medium.

According the present invention, the foregoing object is attained by providing an image processing method further comprising: the segmentation step of segmenting the first image into a plurality of regions; and the setting step of setting processing contents of each of the segmented regions, and wherein the modify step includes the step of modifying the first image in units of regions to obtain the second image.

The invention is particularly advantageous since a simulate illustration process can be done for image data more effectively in brighter tone than a conventional method.

Also, the user can easily set up details of simulate illustration process.

Furthermore, a recording medium on which an image that has undergone a novel process closely resembling a hand illustration is formed can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The file of this patent contains at least one drawing executed in color. Copies of this patent with color drawings will be provided by the Patent and Trademark office upon request and payment of the necessary fee.

The accompanying drawings, which are incorporated in and constitute a part of the specification, illustrate embodiments of the invention and, together with the description, serve to explain the principles of the invention.

FIG. 5 shows an example of a normal filter;

FIG. 7 shows still another example of a filter (3×3);

FIGS. 18A and 18B show examples of special filters in the third embodiment;

DESCRIPTION OF THE PREFERRED EMBODIMENTS

Preferred embodiments of the present invention will now be described in detail in accordance with the accompanying drawings.

First Embodiment

System Arrangement

Figure 1:
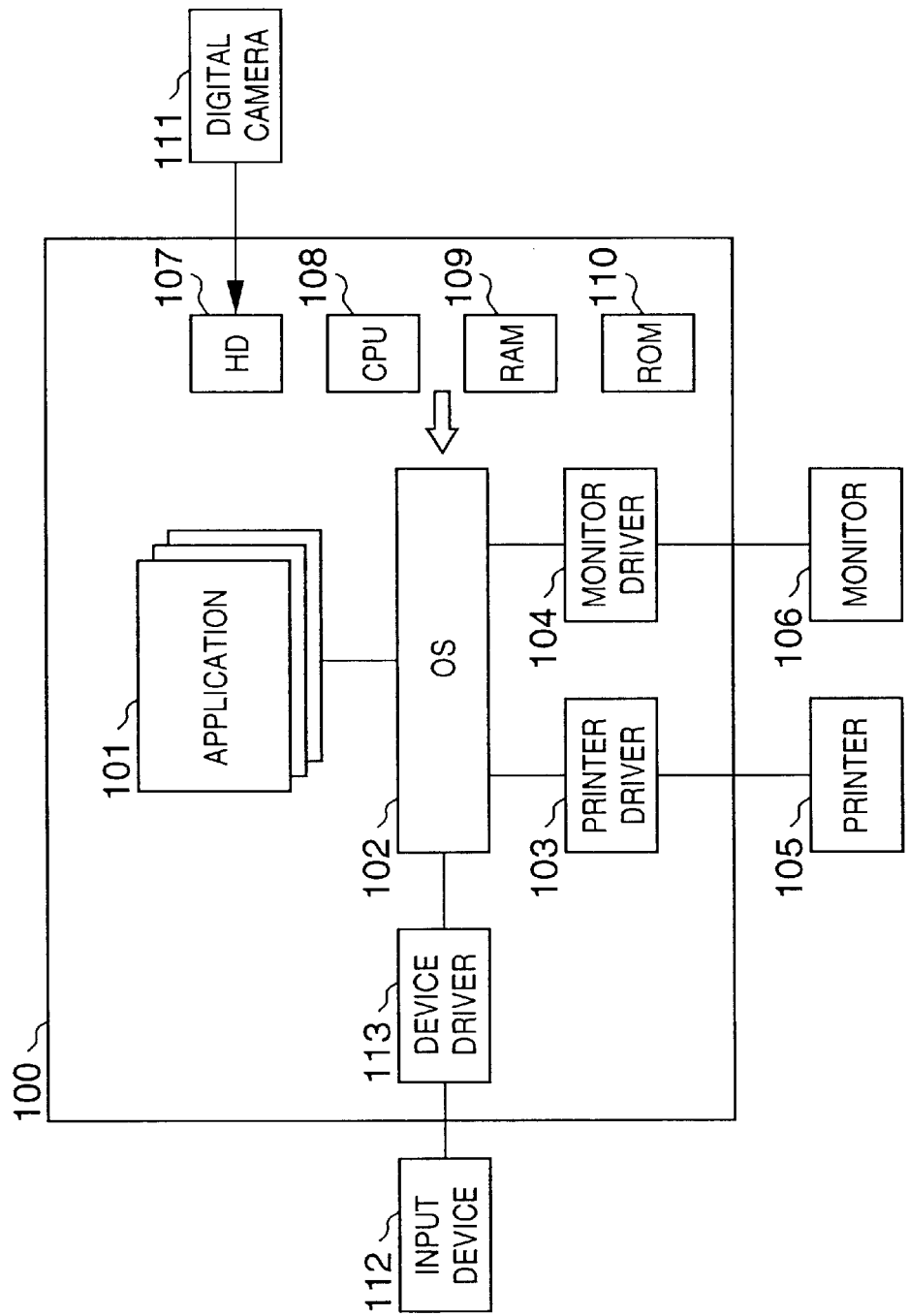
FIG. 1 is a block diagram showing the arrangement of an image processing system according to an embodiment of the present invention.

FIG. 1 shows an example of an image processing system according to this embodiment. A printer 105 such as an ink-jet printer or the like, and a monitor 106 are connected to a host computer 100.

The host computer 100 has as software application software programs 101 such as a wordprocessor, spreadsheet, Internet browser, and the like, an OS (Operating System) 102, a printer driver 103 for processing various drawing commands (image drawing command, text drawing command, graphics drawing command) indicating output images, which are issued by the application software programs 101 to the OS 102, and generating print data, and a monitor driver 104 for processing various drawing commands issued by the application software programs 101 and displaying data on the monitor 106.

Reference numeral 112 denotes an instruction input device; and 113, its device driver. For example, a mouse that points various kinds of information displayed on the monitor 106 to issue various instructions to the OS 102 is connected. Note that other pointing devices such as a trackball, pen, touch panel, and the like, or a keyboard may be connected in place of the mouse.

The host computer 100 comprises, as various kinds of hardware that can run these software programs, a central processing unit (CPU) 108, hard disk (HD) 107, random-access memory (RAM) 109, read-only memory (ROM) 110, and the like.

As an example of the image processing system shown in FIG. 1, Windows98 available from Microsoft Corp. is installed as an OS in a popular PC-AT compatible personal computer available from IBM Corp., desired application programs that can implement printing are installed, and a monitor and printer are connected to the personal computer.

In the host computer 100, each application software program 101 generates output image data using text data which is classified into text such as characters or the like, graphics data which is classified into graphics such as figures or the like, image data which is classified into a natural image or the like, and so forth. Upon printing out the output image data, the application software program 101 sends a print-out request to the OS 102. At this time, the application software program 101 issues a drawing command group which includes a graphics drawing command corresponding to graphics data, and an image drawing command corresponding to image data to the OS 102.

Upon receiving the output request from the application software program 101, the OS 102 issues a drawing command group to the printer driver 103 corresponding to an output printer. The printer driver 103 processes the print request and drawing command group input from the OS 102, generates print data that the printer 105 can print, and transfers the print data to the printer 105. When the printer 105 is a raster printer, the printer driver 103 performs an image correction process for the drawing commands from the OS 102, and then rasterizes the commands in turn on the RGB 24-bit page memory. Upon completion of rasterization of all the drawing command, the printer driver 103 converts the contents of the RGB 24-bit page memory into a data format that the printer 105 can print, i.e., CMYK data, and transfers the converted data to the printer 105.

Note that the host computer 100 can connect a digital camera 111 which senses an object image and generates RGB image data, and can load and store the sensed image data in the HD 107. Note that the image data sensed by the digital camera 111 is encoded by JPEG. The sensed image data can be transferred as image data to the printer 105 after it is decoded by the printer driver 103.

Printer Driver Process

The process executed by the printer driver 103 will be explained below with reference to FIG. 2.

In the printer driver 103, an image correction processing unit 120 executes an image correction process and image edit process (to modify image data; to be described later) for color information of an image drawing command included in the drawing command group received from the OS 102. Then, a printer correction processing unit 121 rasterizes the drawing commands in accordance with the processed color information to generate dot image data on the RGB 24-bit page memory. The unit 121 executes a masking process, gamma correction process, quantization process, and the like in units of pixels in correspondence with color reproducibility of the printer to generate CMYK data depending on the printer characteristics, and transfers them to the printer 105.

An image process for an original image indicated by an image drawing command in the image correction processing unit 120 will be explained below with reference to the flow chart in FIG. 3. Note that an original image indicated by a graphics drawing command or text drawing command does not undergo a process to be described below. Assume that an original image is stored in a predetermined area in the RAM 109.

Figure 3:
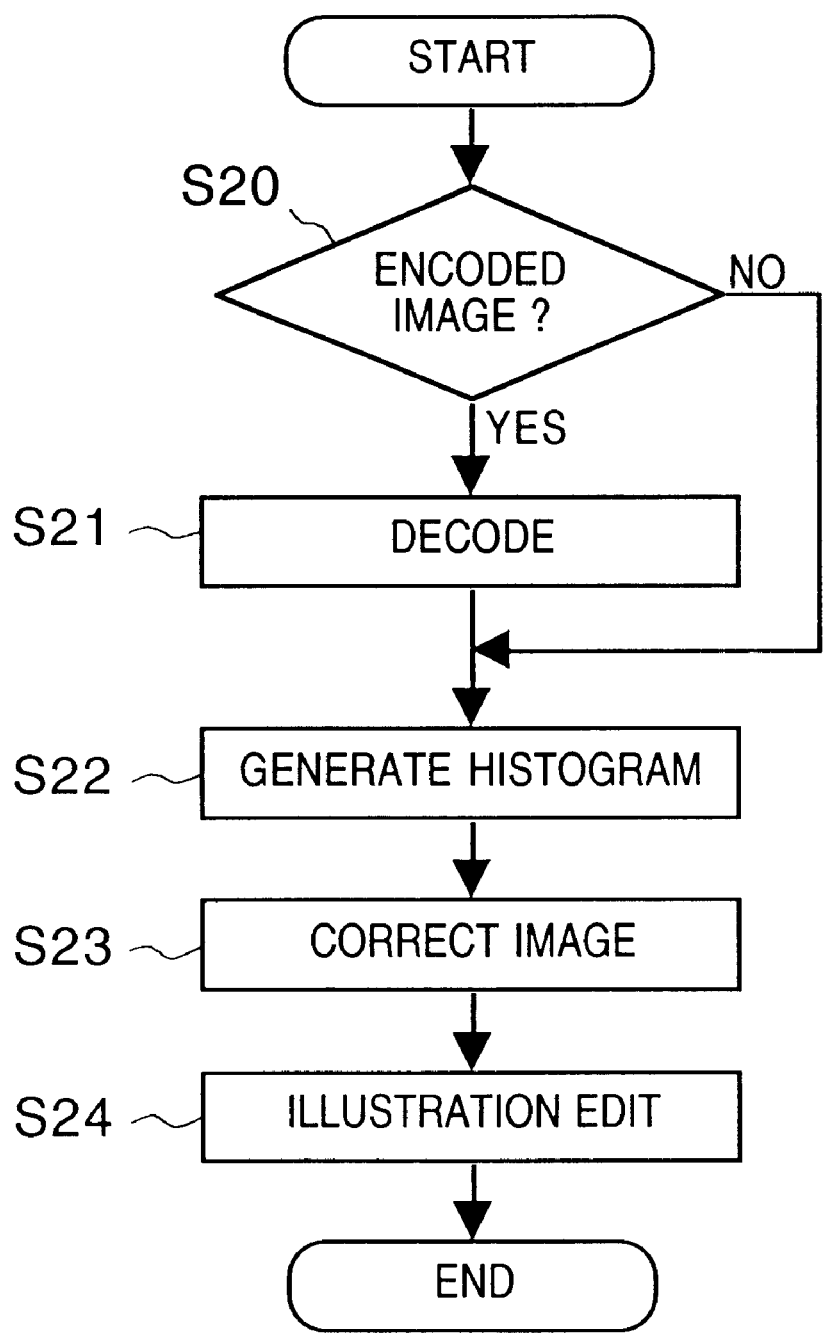
FIG. 3 is a flow chart showing an image process in the printer driver.

The image correction processing unit 120 of this embodiment decodes the original image if it is encoded by, e.g., JPEG (S20, S21), as shown in FIG. 3. After that, the unit 120 executes a histogram generation process (S22) and an image correction process (S23) in accordance with the generated histogram, and then executes a simulate illustration process (S24) in accordance with the generated histogram.

The image that has undergone the simulate illustration process is output to the printer 105 as printable data via the printer correction processing unit 121, and is printed out onto a storage medium.

Figure 4:
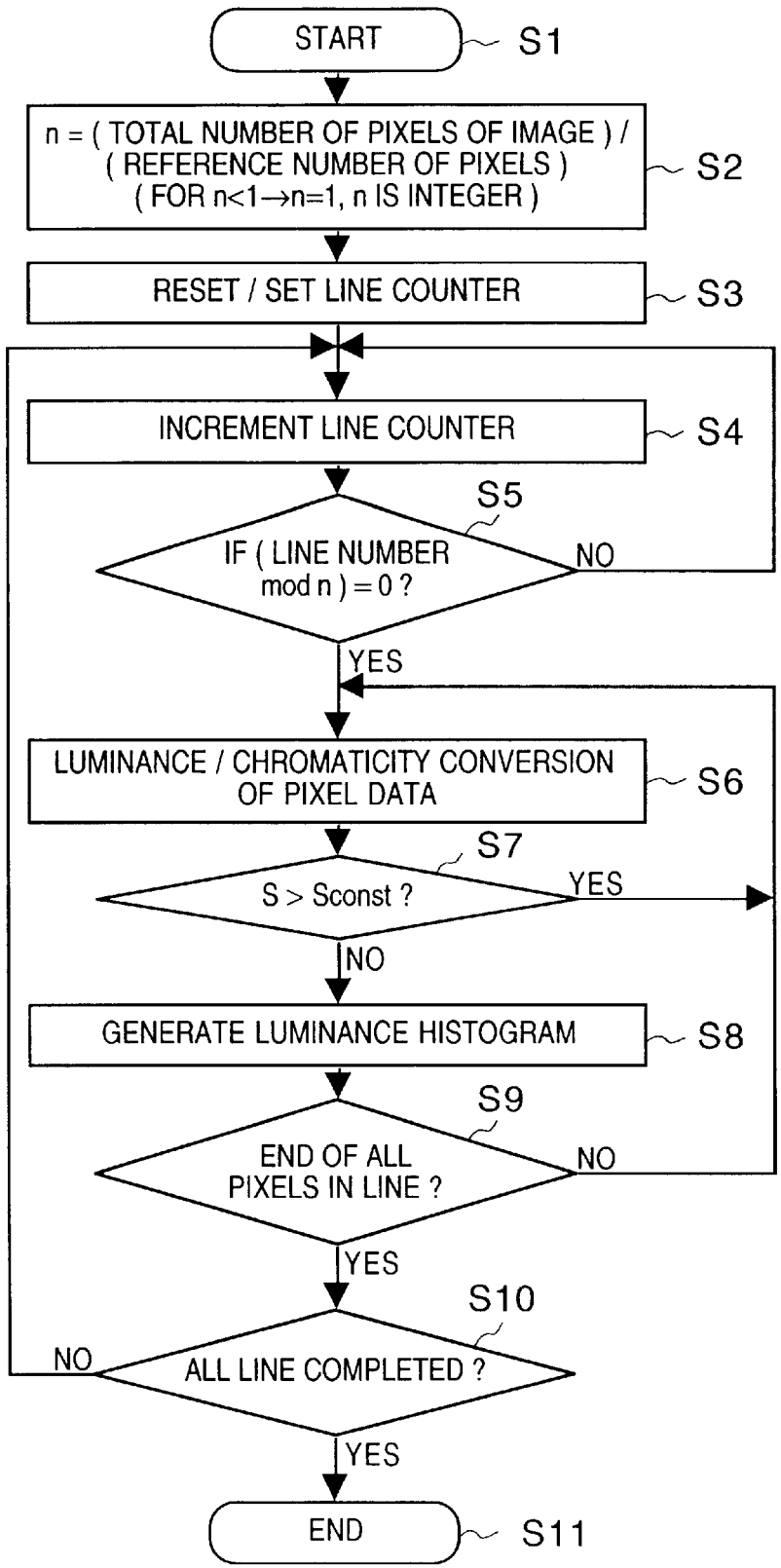
FIG. 4 is a flow chart showing a histogram generation process.

Generation of Luminance Histogram FIG. 4 is a flow chart showing the histogram generation process in step S22.

Referring to FIG. 4, when the control enters an original image luminance histogram generation routine in step S1, the selection ratio of pixels used to generate a luminance histogram to those of an original image is determined in step S2. In this embodiment, when image data to be processed has 350,000 pixels, a luminance histogram is generated for all the pixels (selection ratio=1 (or 100%)). When image data having more than 350,000 pixels is input, pixel selection (sampling) is done in accordance with the ratio of the total number of pixels to 350,000 pixels. For example, when image data having 3,500,000 pixels is input, the selection ratio is 3,500,000/350,000=10, and a luminance histogram is generated at a ratio of one pixel per 10 pixels (selection ratio=10 (or 10%)). The selection ratio n in this embodiment is given by:

$n$=int(total number of pixels of image data to be processed/350,000 as reference number of pixels)

(for n=1 when n<1, n is a positive number)

Subsequently, a counter that manages a line number is reset or set at a predetermined initial value in step S3, and that counter is incremented to indicate the line number of the line of interest in step S4.

In this embodiment, since pixel thinning (sampling) is done in units of lines, when the selection ratio=n, and the remainder obtained upon dividing the line number by n is 0, pixels which belong to that line are selected as those to be processed (S5=YES). For example, when the selection ratio=10, and the remainder obtained upon dividing the line number by 10 is 0, pixels which belong to that line are selected as those to be processed.

If the line of interest is a line to be thinned out, i.e., a line which is not to be processed, the flow returns to step S4. If the line of interest is a line to be processed, the flow advances to step S6, each of pixels which belong to the line of interest is selected in turn, and luminance conversion and chromaticity conversion are done for that pixel of interest. Luminance conversion and chromaticity conversion in this embodiment are attained by:

$Y$(luminance)=int(0.30R+0.59G+0.11B) (Y is a positive integer)

$C1$ (chromaticity)=$R-Y$ $C2$ (chromaticity)=$B-Y$

Note that luminance and chromaticity conversion equations are not limited to the above ones, but may use various other equations.

In this embodiment, in order to improve the detection precision of highlight and shadow points, a saturation S of the pixel of interest is calculated by:

Saturation S=$\sqrt{(C1^2+C2^2)}$

It is then checked if the saturation S is larger than a predetermined saturation value (Sconst) (S7). If S>Sconst, information of that pixel is not reflected in the luminance histogram.

That is, if S>Sconst, the flow returns to step S6 not to reflect data of that pixel in the subsequent processes. In general, since the saturation of the highlight point is given by the average saturation of a high-luminance pixel group, that saturation value includes errors produced by color cast. Hence, a pixel which has a saturation higher than the predetermined value is preferably excluded from a highlight point calculation.

An example of the effect of this process will be explained below. For example, the luminance Y and saturation S of a yellow pixel (R=G=255, B=0) are respectively 226 and 227 from the above equations. That is, this pixel has a very high luminance and assumes a sufficiently high saturation color. It is appropriate to determine that such pixel is an original yellow pixel rather than to determine that the pixel is obtained as a result of yellow cast of an achromatic pixel. When a luminance histogram including such high-luminance/high-saturation pixels is generated, errors are produced in the highlight point detection result. Hence, in this embodiment, the predetermined saturation (Sconst) is determined, and pixels having saturation beyond this value are excluded from the luminance histogram. In this manner, the highlight point detection result can be prevented from suffering any errors due to such high-saturation pixels, and the detection precision of the highlight point can be improved.

However, if the average density of an image need only be detected, as will be described later, the aforementioned process in step S7 in this embodiment may be omitted.

After the decision in step S7, a luminance histogram is generated using pixels that satisfy a condition (S≦Sconst) (S8). Since pixel data RGB to be processed in this embodiment are 8-bit (256 tone levels) data, the luminance Y is also converted into a depth of 256. Hence, the luminance histogram is obtained by counting the frequency of occurrence of pixels corresponding to each of 256-level luminance values ranging from 0 to 255.

Note that the calculated chromaticity values C1 and C2 can be used as data for calculating the average chromaticity of pixels having individual luminance values in, e.g., a color cast correction process. Hence, in this embodiment, data are held as follows. Three members, i.e., the frequency of occurrence, C1 accumulated value, and C2 accumulated value, are set in the format of a structure array variable which has an index range from 0 to 255, and the computation result of each pixel is reflected in each member having the luminance value of that pixel as an index.

Upon completion of processing for the pixel of interest, it is checked if all the pixels in the line of interest have been processed (S9). If pixels to be processed still remain in the line of interest, the flow returns to step S6 to repeat the processes in step S6 and the subsequent steps. Upon completion of processing for all the pixels in the line of interest, it is checked in step S10 if lines to be processed still remain. If processing for all the lines is complete, the flow ends in step S11; otherwise, the flow returns to step S4 to select the next line as the line of interest, thus repeating the aforementioned processes.

In this manner, since the luminance histogram is generated while selecting pixels of original image data, it can be generated using a minimum required number of pixels in consideration of improvement of the precision upon detecting highlight and shadow points.

Image Correction Process

In step S23 in FIG. 3, the original image undergoes an image correction process based on the luminance histogram obtained in step S22. For example, highlight and shadow points of the original image are detected based on the luminance histogram, and image correction processes are made based on the obtained highlight and shadow points. More specifically, in the color correction processes, color cast correction for correcting color cast of the original image, exposure correction for correcting the contrast of luminance to optimize the exposure state of the original image, saturation correction for improving the appearance of colors of an output image, and the like are done. Note that these image correction processes can use known methods, and a detailed description thereof will be omitted. Note that the correction processes described in step S23 may be omitted in this invention.

Simulate Illustration Process

In step S24 in FIG. 3, the original image corrected in step S23 undergoes a simulate illustration process based on the luminance histogram obtained in step S22. This embodiment is characterized in that the original image sensed by, e.g., the digital camera 111 undergoes the simulate illustration process for converting the original image into a hand-illustrated like image.

Figure 5:
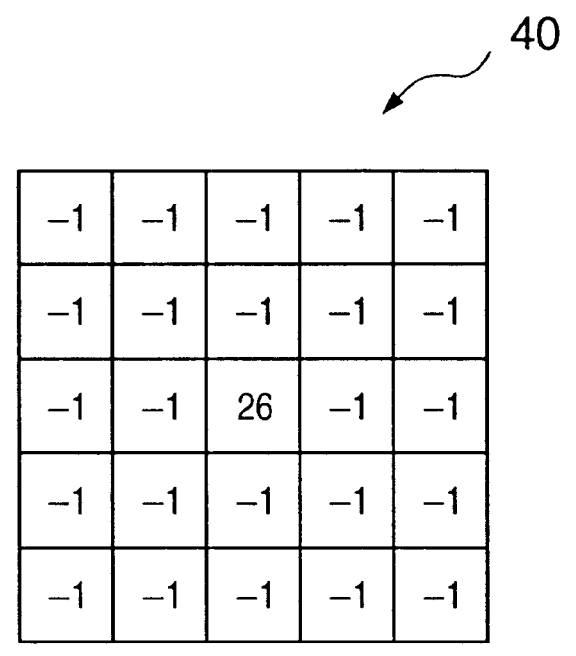
Figure 20A:
FIG. 20A shows an example of an original image (JPEG)
Figure 20B:
FIG. 20B shows an example of an illustration edit result of the original image shown in FIG. 20A using a 3×3 filter.
Figure 20C:
FIG. 20C shows an example of an illustration edit result of the original image shown in FIG. 20A using a 5×5 filter.

The principle of the simulate illustration process in this embodiment will be explained first. In this embodiment, the original image is filtered using a 5 pixels×5 pixels (to be simply referred to as 5×5 hereinafter) filter that satisfies a predetermined condition with respect to the original image to be converted into an image in which edges are extracted (emphasized) and color tone is saved. FIG. 5 shows an example of this filter. For example, when an original image shown in FIG. 20A is filtered using a filter 40 shown in FIG. 5, an image shown in FIG. 20C is obtained. As can be seen from FIG. 20C, since the edges of the original image as a photo image are extracted and the number of tone levels decreases and the brightness of the image increases, the original image is converted into an image that gives an impression closely resembling a hand illustration. Note that the image shown in FIG. 20A is sensed by PowerShotA5 (tradename) as a digital camera available from CANON Corp., and has 810,000 pixels.

A filter that implements the simulate illustration process of this embodiment will be explained below.

As a filter for extracting edges of an image, for example, a Laplacian filter is known. In general, in the Laplacian filter, the coefficient (weight) of the pixel of interest located at the center of the filter is set to be larger than those of surrounding pixels to allow extraction of a density change point in the image, i.e., an edge. Normally, the sum total of coefficients in the Laplacian filter for edge extraction is "0".

The filter for the simulate illustration process (to be simply referred to as a "filter" hereinafter) in this embodiment preferably uses, e.g., the filter 40 shown in FIG. 5, as described above, i.e., a 5×5 filter consisting of coefficients shown in FIG. 5. In the filter 40, since the coefficient of the pixel of interest is set at "26", and coefficients of all surrounding pixels are set at "−1", the sum total of coefficients is "2".

Figure 6A:
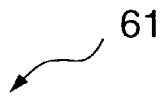
FIGS. 6A to 6C show other examples of filters (5×5)
Figure 6B:
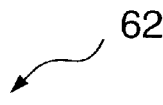
Figure 6C:

The filter in this embodiment is not limited to the filter 40 shown in FIG. 5, and the sum total of coefficients need only be equal to or larger than zero. FIGS. 6A to 6C show other examples of the filter. FIG. 6A shows a filter 61 in which the coefficient of the pixel of interest is set at "25" by subtracting "1" from that of the filter 40, and FIG. 6B shows a filter 62 in which the coefficient of the pixel of interest is set at "27" by adding "1" to that of the filter 40. An image filtered using the filter 61 becomes darker than that obtained by the filter 40, and an image filtered using the filter 62 becomes brighter than that obtained by the filter 40. Hence, according to the characteristics of these filtering results, if the filter 40 is used as a normal filter, the filters 61 and 62 are respectively used as relatively dark and bright filters. Such filter characteristics can be easily understood from the following fact. That is, assuming that a uniform density area of an image is filtered, if the sum total of filter coefficients is "2", the signal value, i.e., its brightness is doubled; if the sum total of filter coefficients is "3", its brightness is tripled.

FIG. 6C shows a filter 63 in which coefficients of pixels around the pixel of interest in the filter 40 are thinned out. In this filter, the coefficient of the pixel of interest is set at "18" to maintain the sum total of coefficients to be "2". According to the filtering process using the filter 63, since the number of coefficients decreases, the computation volume upon filtering can be reduced, and the processing speed can be improved. Note that the coefficients in the filter 62 are thinned out in consideration of edge detection in the vertical, horizontal, and oblique directions.

Figure 7:
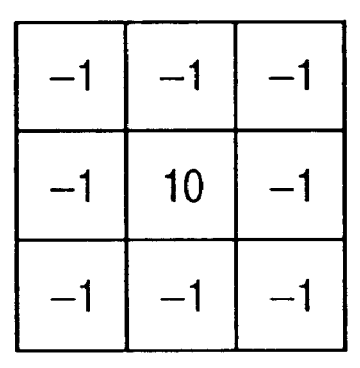

The 5×5 filters have been explained as examples of the filters used in this embodiment. This embodiment can also be practiced using filters having other sizes. For example, the filter size can be defined by n×n (n=2×m+1 (m is an integer equal to or larger than 1)). Also, the filter may have different vertical and horizontal sizes. FIG. 7 shows a 3×3 filter as an example of the filter having another size. When an original image shown in FIG. 20A is filtered using the 3×3 filter shown in FIG. 7, an image shown in FIG. 20B is obtained. In the image shown in FIG. 20B as well, edges are extracted from the original image as a photo image and the number of tone levels decreases, and the brightness increases. However, the illustration edit effect is lower than that of the image shown in FIG. 20C based on the 5×5 filter 40. This is because the 5×5 filter acts to express the extracted edges thicker.

In the simulate illustration process in this embodiment, the thickness of the extracted edges in the converted image changes depending on the filter size. Hence, an optimal filter size upon simulate illustration process is not limited to 5×5 or 3×3 described in this embodiment, and depends on the image size or resolution of an original image, fineness of an object in an image, and the like. For example, when a large filter is applied to a large-size or high-resolution image or an image including a coarse object, or when a small filter is applied to a small-size or low-resolution image or an image including a fine object, the extracted edges become thicker in the former case or thinner in the latter case. On the other hand, the filter size may be set in correspondence with the brightness of an object. Furthermore, the filter size may be set in correspondence with the processing speed required.

In the simulate illustration process in this embodiment, the number of tone levels of image data is decreased, but the brightness need not always be increased.

Such filter process may be automatically selected in correspondence with the size or resolution of an image or the fineness of an object, or may be selected in accordance with a manual instruction of the user. Hence, the present invention includes provision of a user interface for manual selection.

Figure 8:
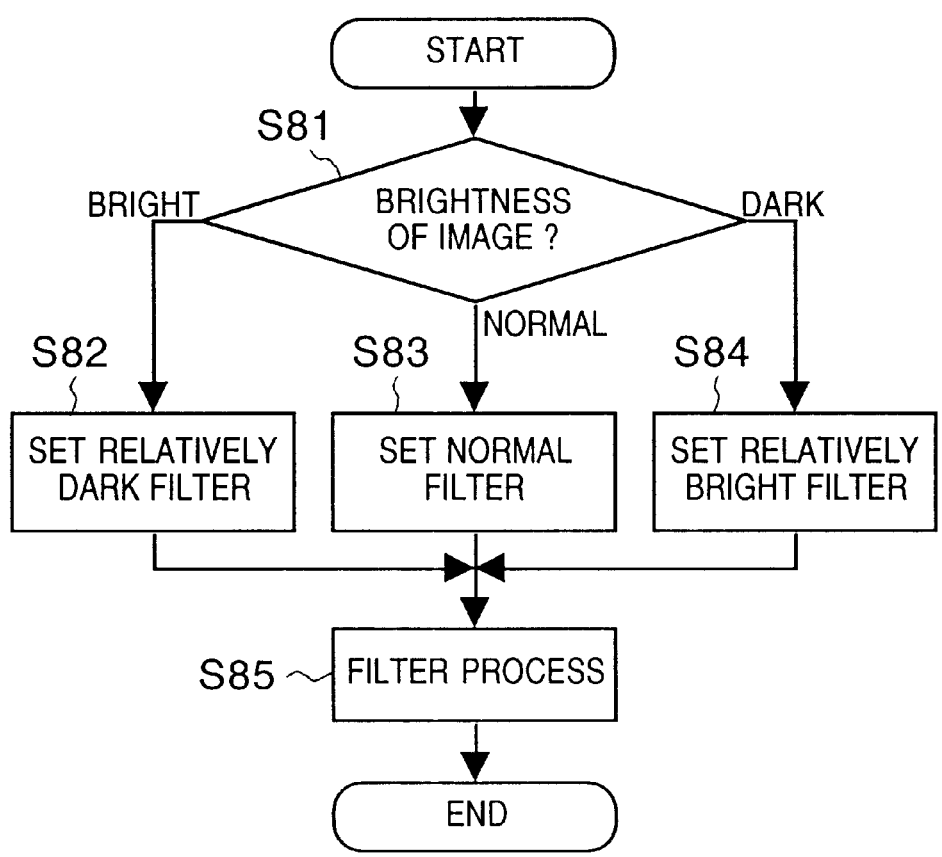
FIG. 8 is a flow chart showing a simulate illustration process.

In step S24 in FIG. 3, the original image corrected in step S23 undergoes the simulate illustration process using the aforementioned filter. FIG. 8 is a flow chart showing the simulate illustration process in this embodiment. In step S81, the brightness of an image is detected on the basis of the luminance histogram generated in step S22 above. As the detection method, the average value, median, or maximum frequency value may be calculated based on the luminance histogram, and is compared with a predetermined threshold value to detect a plurality of brightness levels. For example, by setting a predetermined range corresponding to a "normal" brightness level in advance, an image which has brightness higher than that predetermined range is determined to have "bright" level, and an image which has brightness lower than the predetermined range is determined to have "dark" level, thus allowing detection of three different brightness levels.

Based on the brightness level detected in step S81, a filter is set in step S82, S83, or S84. That is, if the original image has "bright" level, the filter 61 as a relatively dark filter is set in step S82 to decrease the brightness of the conversion result; if the original image has "normal" level, the filter 40 as a normal filter is set in step S83; or if the original image has "dark" level, the filter 62 as a relatively bright filter is set in step S84 to increase the brightness of the converted image.

In step S85, the original image is filtered using the selected filter, thus implementing appropriate simulate illustration process.

Note that the number of brightness levels to be determined is not particularly limited, and can be set in correspondence with filters that can provide appropriate effects in units of levels.

In this embodiment, since the printer driver 105 executes the simulate illustration process, the entire region of the original image cannot undergo a batch process. For this reason, the original image is segmented into region blocks each consisting of a plurality of lines, and the illustration process is done in units of blocks. Hence, in order to avoid block boundaries from becoming conspicuous in the converted image, the filter size is changed to a smaller one, e.g., 3×5 or the like near the final line of each block. In this manner, continuity of block boundaries can be maintained in the converted image.

As described above, according to this embodiment, an original image can easily undergo simulate illustration process only with modifying image data, and a hand-illustrated like image can be obtained with an atmosphere of the original image, since its lightness increases. As the illustration-edited image has a smaller number of tone levels than the original image, the data size of the image can be reduced.

In this embodiment, the luminance histogram of an original image is generated, and the original image undergoes the image correction process based on that luminance histogram. After that the simulate illustration process is executed based on the luminance histogram. However, the image correction process based on the luminance histogram need not always be required. When the simulate illustration process alone is done immediately after the luminance histogram is generated, the processing speed can be improved.

When the user manually designates brightness he or she wants in correspondence with the exposure state or the like of an original image, the histogram generation process in step S22 may be omitted.

On the other hand, filter control in the simulate illustration process may be done on the basis of parameters based on the image correction process such as contrast information between the background and object, scene information to which an image belongs, and the like, which are used as discrimination conditions upon executing color correction or the like in the image correction process.

In this embodiment, a histogram of a luminance signal Y is generated. Alternatively, brightness detection may be done based on the histogram of G components without executing any luminance/chromaticity conversion of original image data. In this case, an increase in processing speed can be expected since no luminance/chromaticity conversion is done.

In this embodiment, an original image is RGB data. Of course, the present invention can be applied even when the original image has other formats. For example, original image data having another format may be converted into the RGB format, and the individual color components of the converted data may undergo the simulate illustration process of this embodiment or a filter corresponding to the data format of the original image may be applied. For example, when an original image has a YMC format, the signs of the coefficients of the filters used in this embodiment may be inverted. Even when an original image has a YHS format or the like, the present invention can be applied. For example, when an original image has a format such as an Lab format or the like that allows extraction of only a luminance component, only the luminance component can be filtered, thus reducing the computation volume compared to that of filtering in units of components of the RGB format.

The image to be subjected to simulate illustration process in this embodiment is not limited to an image sensed by the digital camera. For example, a photo image scanned by, e.g., a photoscanner or the like may be input, or a photo image stored in a medium of an external device such as a CD-ROM may be used.

In this embodiment, the filter coefficients are controlled to implement the simulate illustration process. However, an illustration-edited image obtained by extracting image edges and by decreasing the number of tone levels and by increasing its brightness can also be obtained by a method other than filter coefficient control. For example, a program may be set in advance to automatically execute a process for increasing the brightness of the entire image and decreasing the number of tone levels, after an original image undergoes a conversion process such as an oil paint process or the like to obtain a hand-painted like image by an application such as Photoshop (tradename) available from Adobe Corp., thus obtaining a hand-illustrated like image shown in FIG. 20C.

Second Embodiment

The second embodiment of the present invention will be described below.

In the first embodiment, the simulate illustration process is automatically executed for an original image. In the second embodiment, an image processing system that allows the user to input an arbitrary edit instruction will be explained.

Since the system arrangement in the second embodiment is the same as that in the first embodiment, a detailed description thereof will be omitted.

Figure 9:
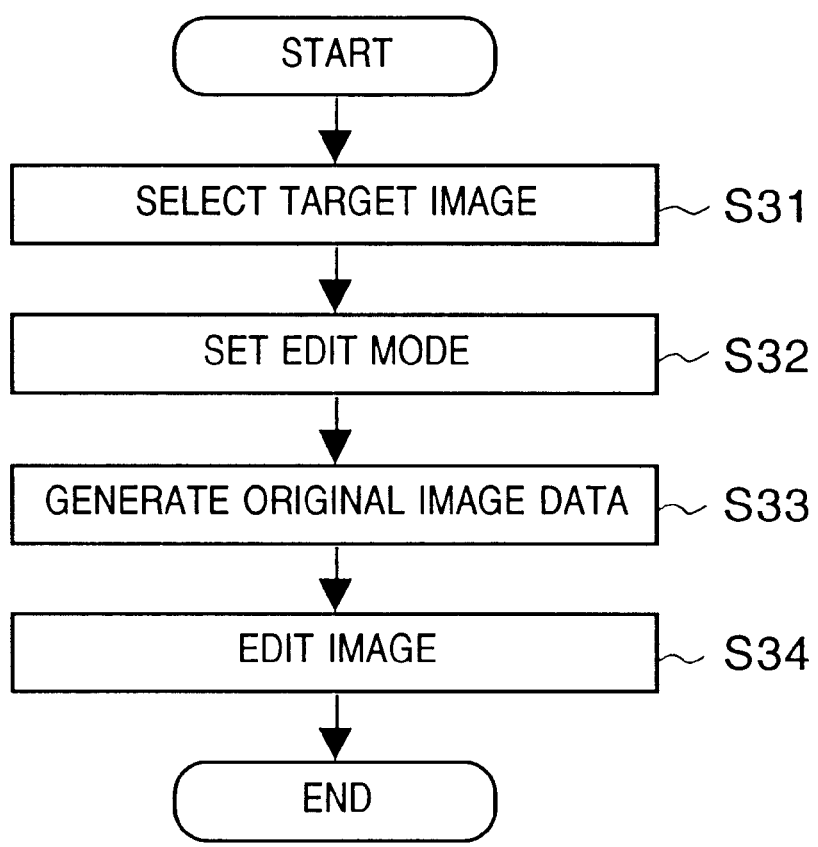
FIG. 9 is a flow chart showing an image edit process according to the second embodiment of the present invention.

FIG. 9 is a flow chart showing the image edit process in the second embodiment. In FIG. 9, the same step numbers denote the same processes as those in FIG. 3 in the first embodiment. Note that of the processes shown in FIG. 9, processes which require a user interface are implemented by the predetermined application software programs 101, and other processes are implemented by the image correction processing unit 120 in the printer driver 103.

Target Image Selection

Figure 10:
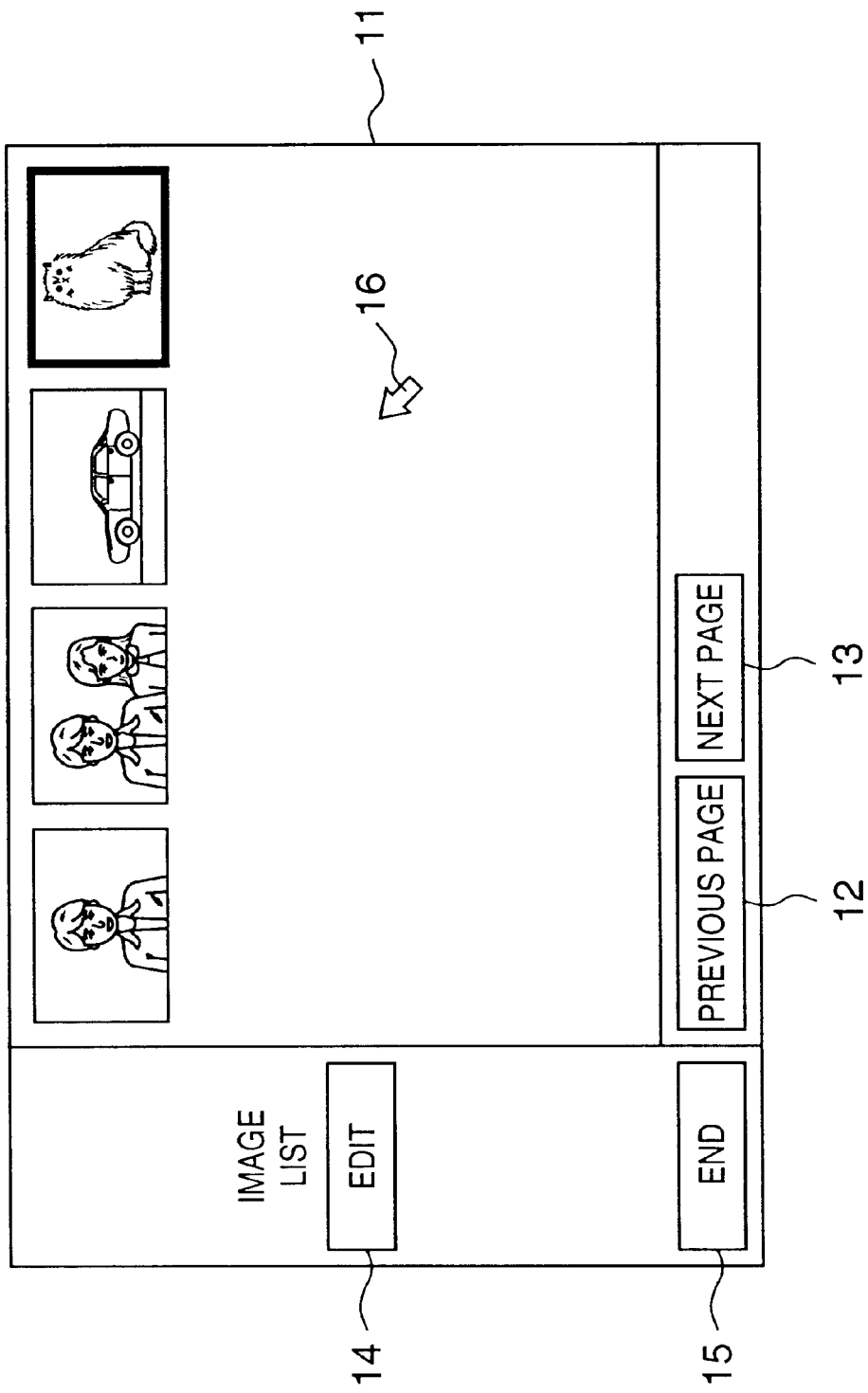
FIG. 10 shows an example of a selection window for an image to be edited.

In step S31, the user selects an image to be edited. FIG. 10 shows an example of the selection window for an image to be edited, which is displayed on the monitor 106 upon launching a predetermined image application 101. Referring to FIG. 10, reference numeral 11 denotes an image display frame for displaying a list of reduced-scale images (thumbnail images) of candidate images which may undergo the edit process of this embodiment. These images may be input from the HD 107 or a medium of an external storage device such as a CD-ROM or the like, or may be read out from the RAM 109 or ROM 110. The images displayed on the image display frame 11 are not limited to thumbnail images. For example, an arbitrary one of thumbnail images displayed in a list may be selected, and may be displayed after it is decoded. Reference numeral 14 denotes a button for instructing to start an image edit process; and 15, a button for instructing to end the image edit process. Other function buttons may be provided. Note that text display "list of images" displayed above the "edit" button 14 indicates that the current display on the image display frame 11 is list display of images.

On the target image selection window shown in FIG. 10, the user moves a cursor 16 on the screen onto a desired image on the image display frame 11 by the instruction input device such as a keyboard, mouse, or the like, and makes execution operation such as clicking or the like, thus selecting that image. In FIG. 10, the image displayed on the right end of the image display frame is selected, and is highlighted by a bold frame. Note that a plurality of images may be selected. When the user makes execution operation by moving the cursor 16 onto the "edit" button 14 while at least one image is selected, the selected image is determined, and the start instruction of the image edit process is issued. The selected image data is loaded onto a predetermined area on the RAM 109 in the RGB format.

Edit Mode Selection

In step S32, the user then designates an edit mode (illustration mode in this embodiment) to be executed. In this embodiment, the user designates an arbitrary one of a plurality of edit modes prepared in advance. An edit mode selection process will be explained below with reference to FIG. 11.

Figure 11:
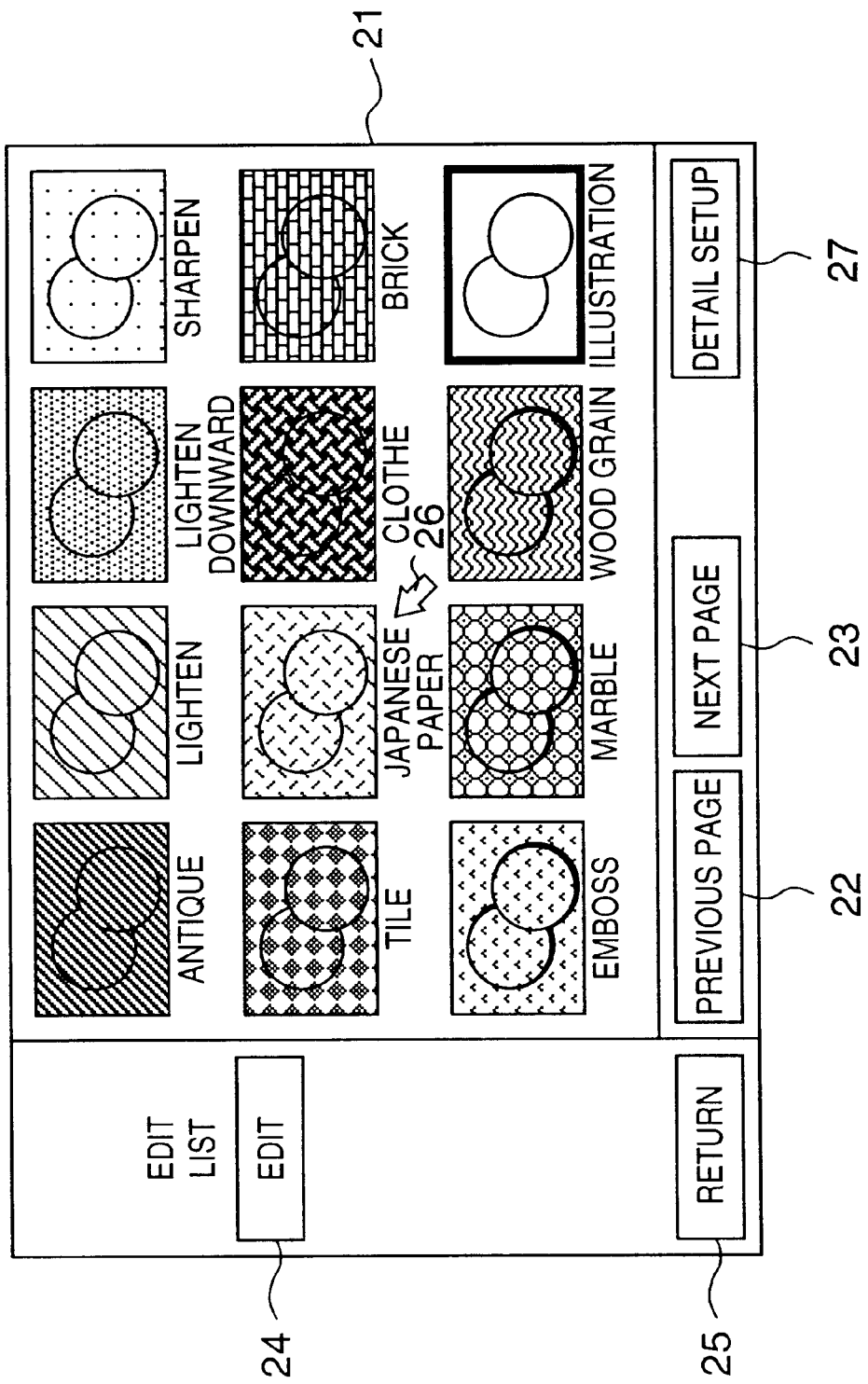
FIG. 11 shows an example of a selection window for a modify mode.

FIG. 11 shows the edit mode selection window, which is displayed on the monitor 106 after the image to be edited is selected, as described above. Referring to FIG. 11, reference numeral 21 denotes an edit mode display frame for displaying a list of edit modes, which can be executed in this embodiment, together with images that represent their outlines. The edit mode display frame 21 can display the previous or next page upon operation of a button 22 or 23, and can display other edit modes. Reference numeral 27 denotes a button pressed upon setting details. Reference numeral 24 denotes a button for instructing to start the image edit process; and 25, a button used to return to the target image selection window shown in FIG. 10. In FIG. 11 as well, other function buttons may be provided. Note that text display "list of edit modes" displayed above the "return" button 25 indicates that the current display on the edit mode display frame 21 is list display of edit modes.

A description of the detailed contents of the individual edit modes will be omitted. For example, for edit modes (brick mode and the like) for printing predetermined texture data to overlap an original image, RGB data indicating a predetermined color suitable for the mode is stored on a predetermined area on the RAM 109 or ROM 110 as texture data together with a predetermined pattern.

Note that the images that represent outlines of the individual edit modes displayed on the edit mode display frame 21 in FIG. 11 may be prepared in advance in the apparatus. For example, the image data to be edited selected in FIG. 10 or its thumbnail data may actually undergo edit processes corresponding to the individual modes, and the process results may be displayed (previewed) on the edit mode display frame 21.

On the edit mode selection window shown in FIG. 11, the user moves a cursor 26 on the screen onto a desired edit mode on the edit mode display frame 21 by the instruction input device such as a keyboard, mouse, or the like, and makes execution operation such as clicking or the like, thus selecting that edit mode. In FIG. 11, an "illustration" mode is selected and is highlighted by a bold frame.

Detail Setup for Simulate Illustration Process

Figure 12:
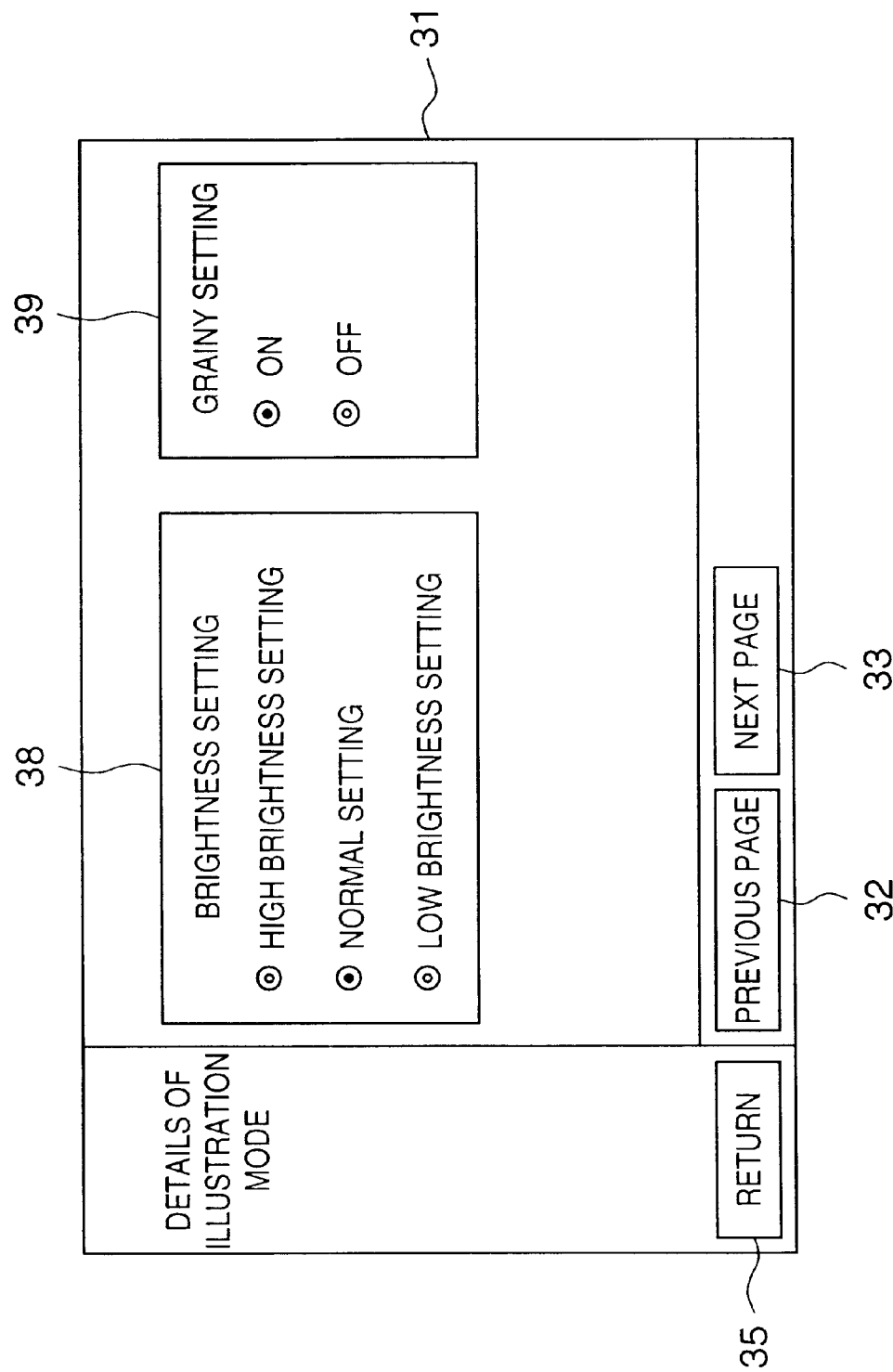
FIG. 12 shows an example of a setup window for details of an illustration mode.

When the user further clicks the detail setup button 27 in this state, he or she can arbitrarily set detailed parameters upon an edit process in the illustration mode, i.e., in the simulate illustration process. FIG. 12 shows an example of the detail setup window. Referring to FIG. 12, reference numeral 31 denotes an image display frame for displaying items that the user can set. Upon operation of a button 32 or 33, the image display frame 31 can display other items that the user can set. Reference numeral 35 denotes a button used to return to the edit mode selection window shown in FIG. 11. Note that text display "illustration mode details" indicates that the current display on the image display frame 31 is to set up detailed items in the simulate illustration process.

Fields 38 and 39 displayed within the image display frame 31 are respectively used to brightness setting and grainy setting parameters. In the brightness setting field 38, the user selects a "high brightness setting" or "low brightness setting" button depending on whether he or she wants to make the illustration-edited image relatively bright or dark. Of course, a "normal setting" button is selected as a default. A filter is selected in correspondence with the selected brightness parameter. In the grainy setting field 39, whether or not a grainy edit process is executed is set by either an ON or OFF button. For example, the ON button is selected as a default.

Note that setup items shown in FIG. 12 are merely examples, and setup items based on other parameters may be provided. For example, parameters that pertain to setups of filter sizes described in the first embodiment may be set by the user.

Upon completion of setups of various detailed items by the user, the user presses the "return" button 35 to display the edit mode selection window shown in FIG. 11 again. Upon clicking the "edit" button 24, the edit mode setup process in step S32 ends, and the simulate illustration process, which has been selected and set up in detail by the user, is started.

The grainy edit setups in the second embodiment will be explained below. In the first embodiment described above, an image sensed by the digital camera 111 mainly undergoes simulate illustration process. Hence, since the image to be edited has already undergone block encoding, e.g., JPEG encoding, block distortion unique to block encoding is produced although it is not so conspicuous. The original image example shown in FIG. 20A in the first embodiment is an image which is JPEG-encoded and then decoded. Hence, in the illustration-edited image shown in FIG. 20C, since block distortion is emphasized by filtering, fine noise components are produced and form grains. However, since grains form, the illustration-edited image becomes a unique one that does not give any monotonous impression. In the second embodiment, such granularity is used as one (grainy effect) of illustration effects, and the user can select whether or not the effect (grainy effect) is added.

In step S33 in FIG. 9, the image to be edited selected in step S31 is read out on the basis of the edit mode and detailed parameters set in step S32, and is stored on a predetermined area in the RAM 109 as original image data to be edited.

Original Image Data Generation Process

Figure 13:
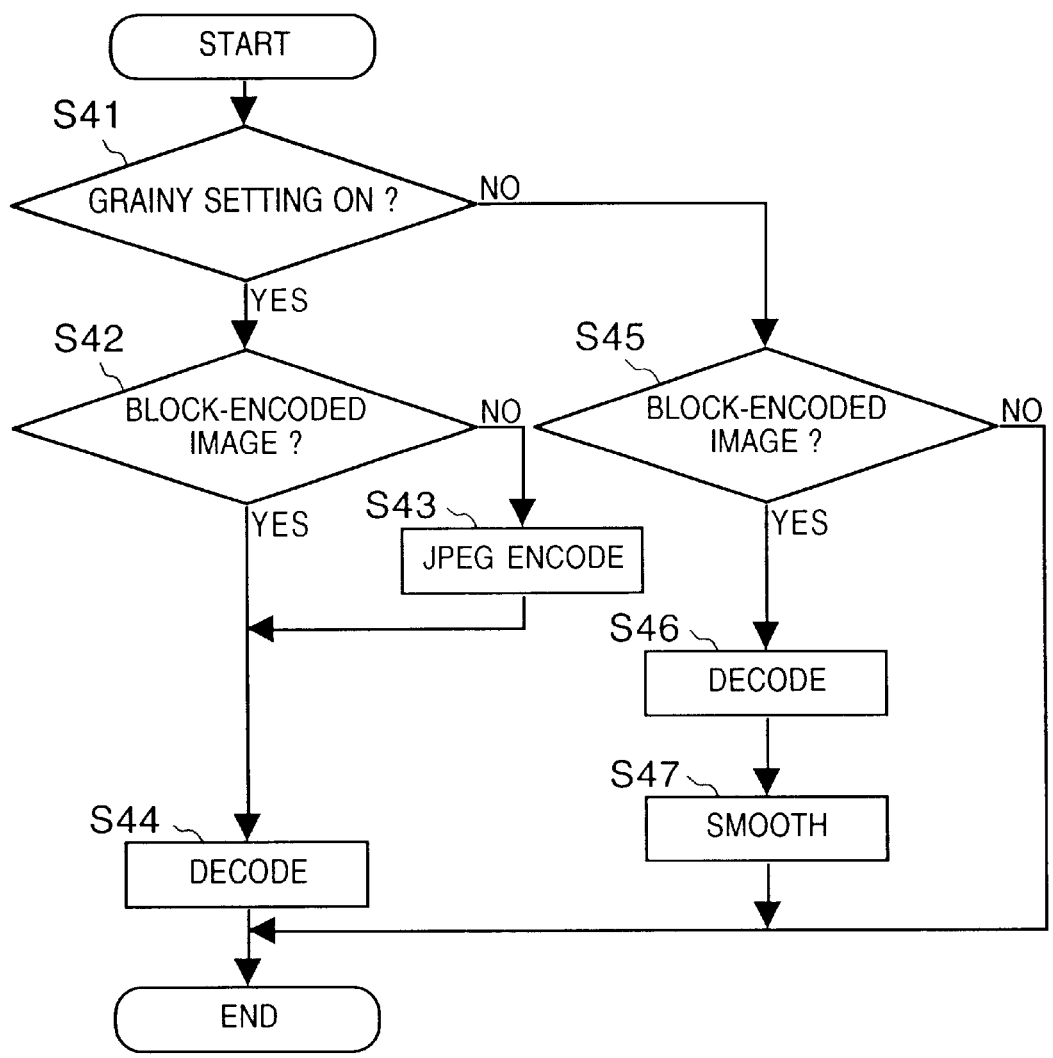
FIG. 13 is a flow chart showing an original image data generation process.

A process executed when the illustration mode is selected will be explained below as an example of an original image data generation process in step S33. FIG. 13 is a flow chart showing the original image data generation process in the illustration mode.

It is checked in step S41 if the grainy edit setup parameter is "ON". If the grainy edit setup parameter is "ON", i.e., the user requests to add the grainy effect, the flow advances to step S42 to check if the selected image to be edited is an image encoded by block encoding. If the image to be edited is a block-encoded image, that image is decoded in step S44. On the other hand, if the image to be edited is not a block-encoded image, the image is encoded by JPEG in step S43.

In step S43, the image data to be edited is converted into JPEG codes irrespective of its data format. For example, when an image has been encoded by another format, it is decoded and is then encoded by JPEG to give block distortion. After that, the encoded image is decoded in step S44.

On the other hand, if it is determined in step S41 that the grainy edit setup parameter is "OFF", since the user requested to turn off the grainy effect, the flow advances to step S45 to check if the selected image to be edited is an image encoded by JPEG. If the image to be edited is a JPEG-encoded image, that image is decoded in step S46. Furthermore, the decoded image is smoothed in step S47 to remove block distortion. On the other hand, if it is determined in step S45 that the image to be edited is not a JPEG-encoded image, the image undergoes, e.g., a decoding process corresponding to its format, thus ending the process.

As can be seen from the flow chart shown in FIG. 13, when the grainy edit setup parameter is "ON", the processing speed for a JPEG image becomes higher since smoothing in step S47 is skipped.

Image Edit (Simulate Illustration) Process

In step S34, the image edit process in the edit mode set in step S32 is executed for the original image data.

Figure 14:
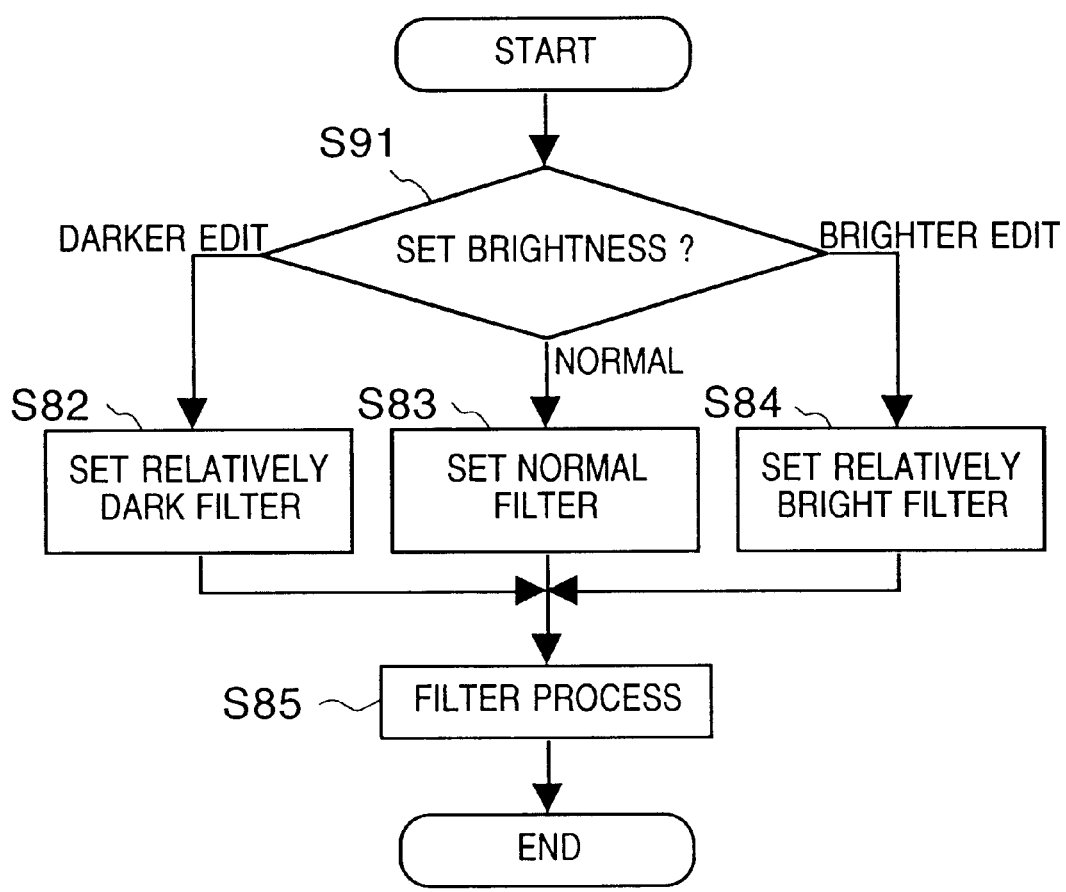
FIG. 14 is a flow chart showing a simulate illustration process.

A simulate illustration process as an example of the image edit process in step S34 will be explained below. FIG. 14 is a flow chart showing the simulate illustration process. The same step numbers in FIG. 14 denote the same processes as those in FIG. 8 described in the first embodiment. Referring to FIG. 14, a filter is set in step S82, S83, or S84 in correspondence with the contents of the brightness setup parameter in the illustration mode, which are set as described above, and are discriminated in step S81. More specifically, if a "darker edit" setup parameter is selected, the filter 61 as a relatively dark filter is set in step S82; if a "normal edit" setup parameter is selected, the filter 40 as a normal filter is set in step S83; or if a "brighter edit" setup parameter is selected, the filter 62 as a relatively bright filter is set in step S84. Based on the selected filter, the original image is filtered in step S85, thus implementing simulate illustration process that the user wanted.

Figure 21A:
FIG. 21A shows an example of an original image (TIFF)
Figure 21B:
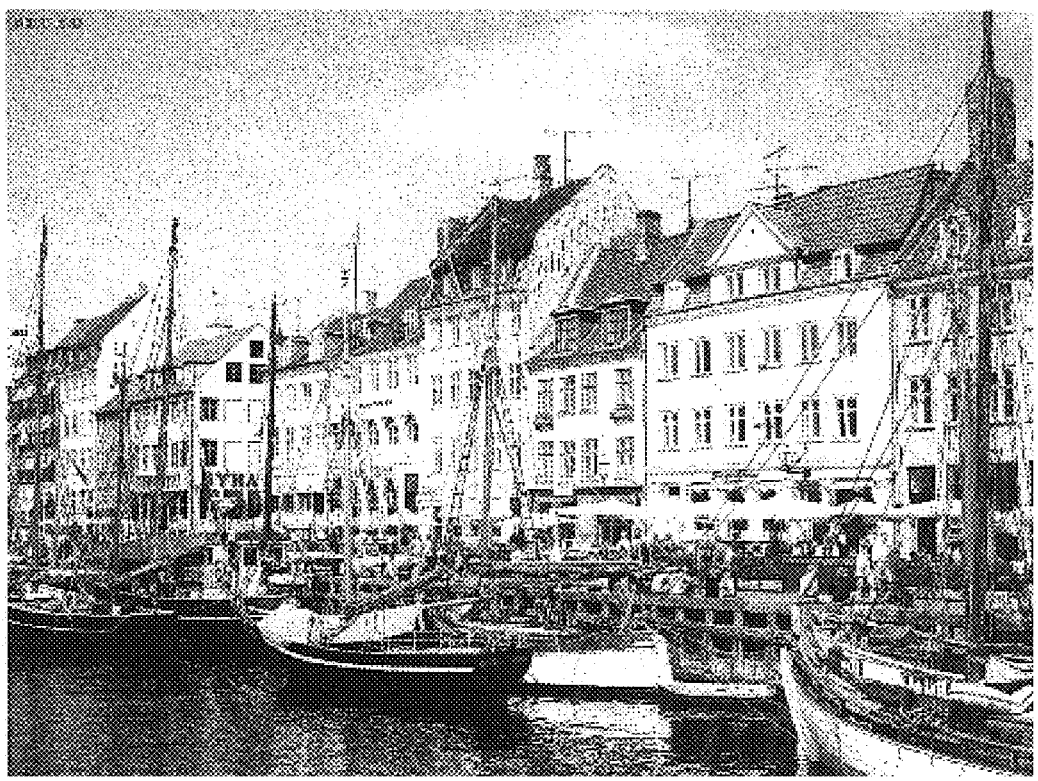
FIG. 21B shows an example of an illustration edit result of the original image shown in FIG. 21A using a 3×3 filter.
Figure 21C:
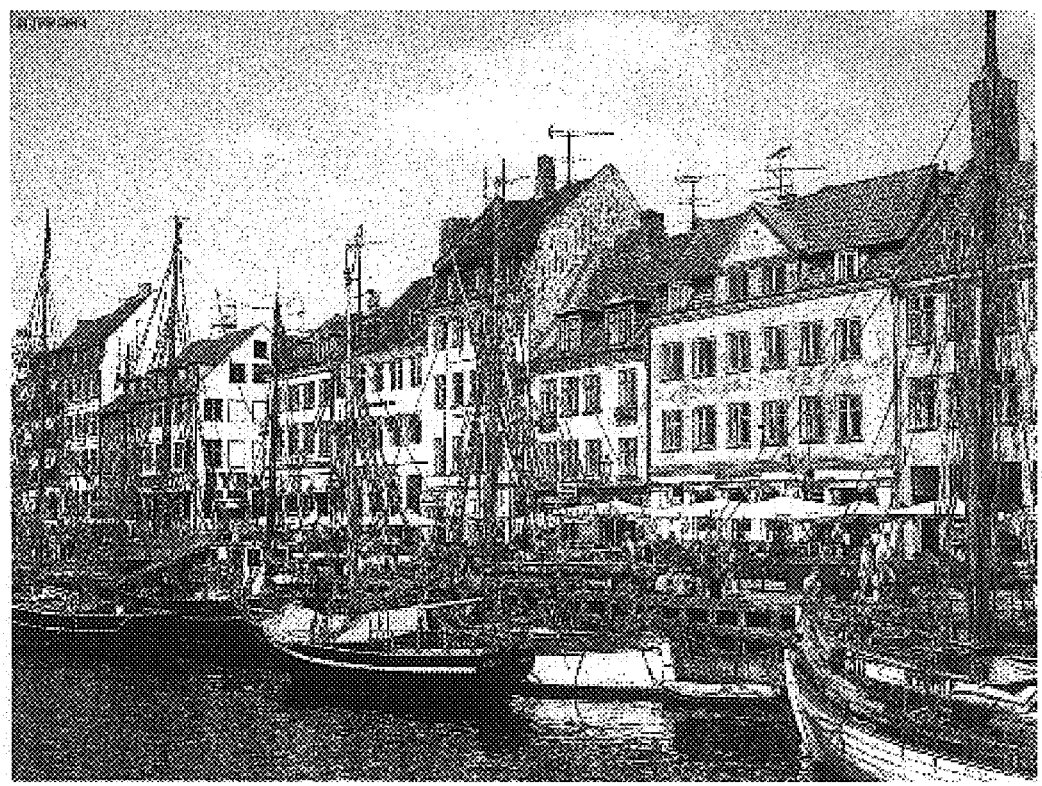
FIG. 21C shows an example of an illustration edit result of the original image shown in FIG. 21A using a 5×5 filter.

As described above, according to the second embodiment, the user can select whether the grainy edit setup parameter is ON or OFF. FIGS. 21A to 21C show examples of the illustration edit result when the grainy edit setup parameter is OFF. FIG. 21A shows an image obtained by decompressing an image which has been compressed in the TIFF format. That is, this image does not have any block distortion unique to JPEG. FIG. 21A shows a standard image (SHIPP) of The Institute of Image Electronics Engineers of Japan, which has 4,096×3,027 (around 12.5 million) pixels. FIGS. 21B and 21C respectively show the illustration edit results of the image shown in FIG. 21A using 3×3 and 5×5 filters. For example, as can be seen from FIG. 21C, a monochrome illustration edit result in which production of granularity is suppressed is obtained compared to the grainy image shown in FIG. 20C. As in FIGS. 20A to 20C, the image filtered by the 5×5 filter shown in FIG. 21C presents the higher illustration edit effect than the image filtered using the 3×3 filter shown in FIG. 21B.

As described above, according to the second embodiment, since the user can select an arbitrary edit mode and can setup the details of the selected mode, simulate illustration process can be achieved in the mode that the user wanted especially in the process. Furthermore, since the histogram generation process and the like in the first embodiment need not be executed, high-speed processing can be realized.

Note that the second embodiment has exemplified the edit process especially in the illustration mode of a plurality of selectable edit modes. However, the present invention is not limited to such specific edit mode, and when a plurality of edit processes including simulate illustration process are executed in a predetermined order, a more effective edit result can be obtained.

In the above embodiments, the image edit function is provided to the printer driver. Of course, this function can be implemented when the OS executes an application.

Also, in the above description, various kinds of information and areas required in the simulate illustration process are assured on a predetermined area on the RAM 19. The areas may be assured upon launching an application that implements the edit process, or may be assured when they are needed. According to the latter method, since an excessive memory area need not be assured, a larger memory area can be assigned to other processes, thus improving the memory efficiency.

Third Embodiment

The third embodiment of the present invention will be described below.

According to the first and second embodiments, a simple simulate illustration process is implemented for a photo image by filtering.

However, when this simulate illustration process is implemented by a printer driver, the following problem is posed.

More specifically, it is a common practice for serial printers represented by ink-jet printers and the like to execute a raster process to save the memory size used. In this case, since an image is segmented and processed, one processing unit does not always have data for a plurality of lines, and data for only one line may be processed in an extreme case. Hence, when an image undergoes simulate illustration process by means of filtering, the number of pixels to be filtered other than the pixel of interest often becomes very small. This means deterioration of the quality of an image obtained as an edit result.

To solve such problem, the third embodiment will exemplify an effective simulate illustration process even for rasterized image data.

Figure 2:
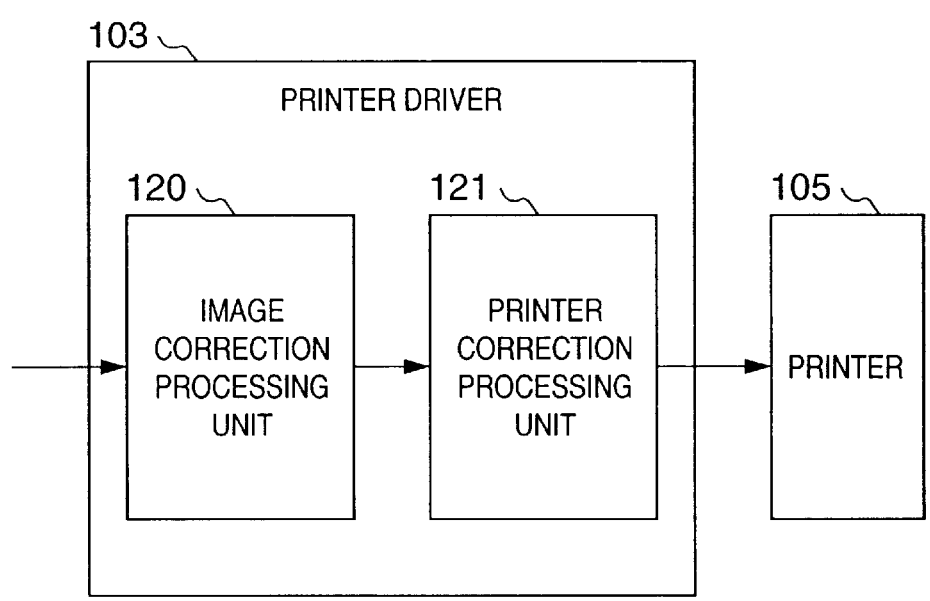
FIG. 2 is a block diagram of a printer driver.

Since the system arrangement and an outline of processes by the printer driver in the third embodiment are the same as those shown in FIGS. 1 to 3 in the first embodiment, a detailed description thereof will be omitted.

Simulate Illustration Process

In the third embodiment as well, by filtering R, G, and B planes of an original image using the filter described in the first embodiment, the original image can be easily converted into a hand-illustrated like image. In the third embodiment, in order to reduce the computation volume, RGB data are decomposed into luminance and color difference signals, only the luminance signal is filtered, and the color difference signals are multiplied by a given constant in correspondence with desired brightness.

Luminance (Y)/chromaticity (C1, C2) conversion are done by:

$$Y=0.30R+0.59G+0.11B)$$

$$C1=R-Y$$

$$C2=B-Y$$

Note that the luminance and chromaticity conversion equations are not limited to the above ones, but may use various other equations.

In the third embodiment, the luminance signal Y undergoes, e.g., a simulate illustration process using the filter 40 shown in FIG. 5. Note that the coefficient (weight) of the pixel of interest can be set at "26" if the original image has sufficient exposure (standard brightness), i.e., need only comply with a rule that the sum total of coefficients that define the filter is "2". On the other hand, if a relatively dark image is to be obtained, the coefficient of the pixel of interest can be set at "25"; if a relatively bright image is to be obtained, the coefficient (weight) of the pixel of interest can be set at "27", "28", . . . . When exposure is inappropriate, the original image may be corrected by the image correction processing unit 120.

Figure 19A:
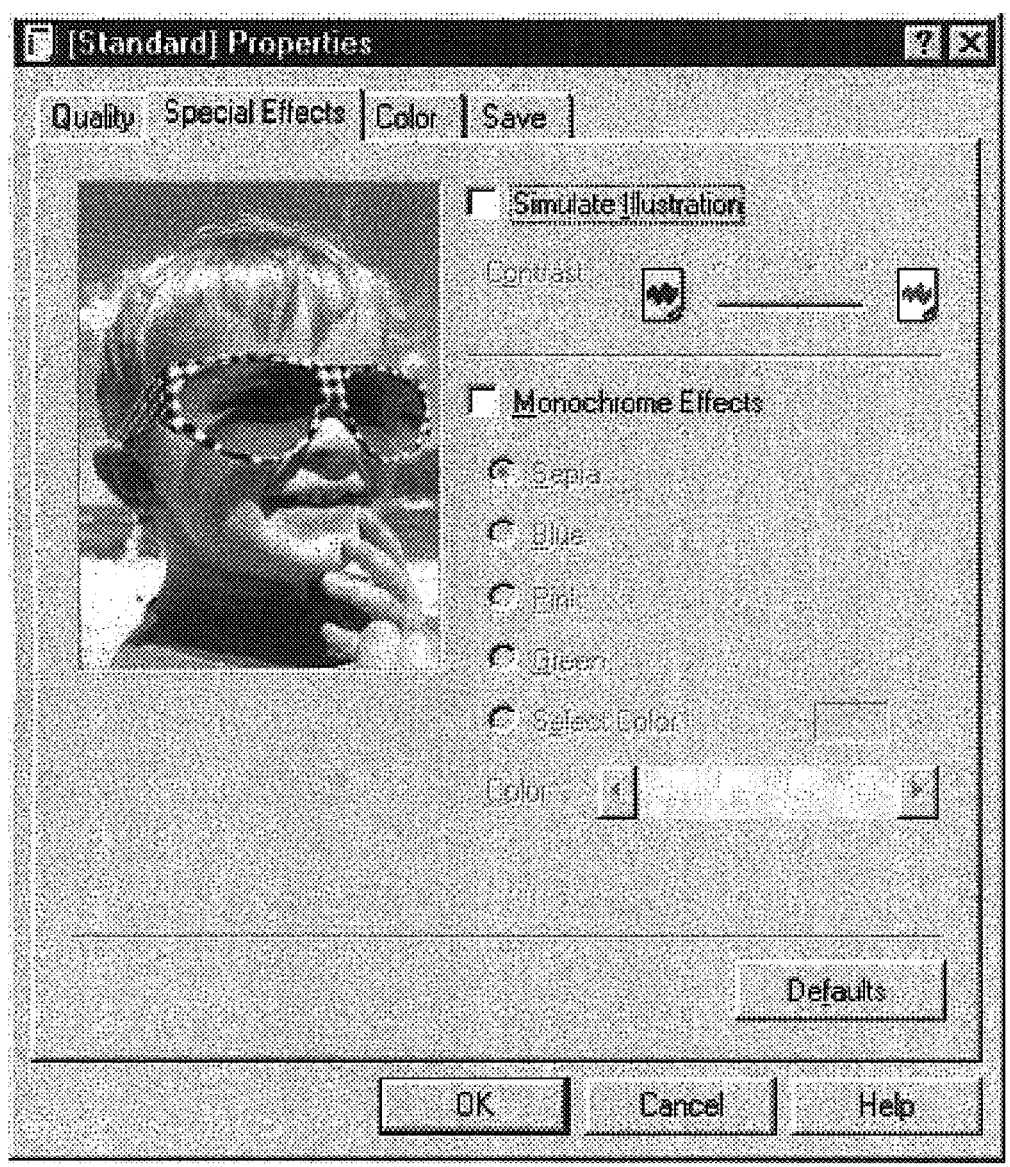
FIGS. 19A to 19C show a user interface used to set up an image process according to the fourth embodiment of the present invention.
Figure 19B:
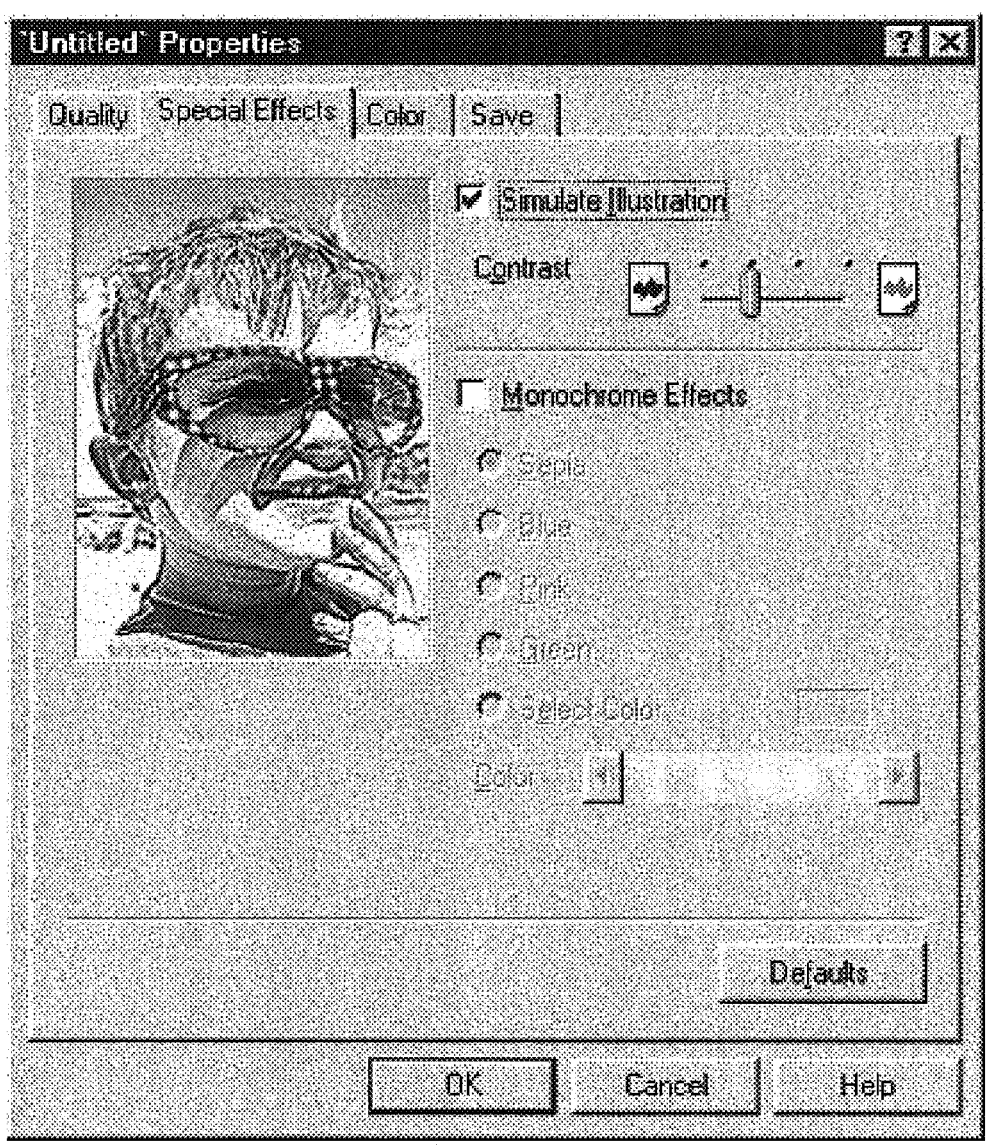

In this case, the user selects a desired brightness level using a user interface shown in, e.g., FIG. 19B, and the coefficient of the pixel of interest is set in accordance with the selected brightness level. For example, when the user wants to set a standard brightness level, the luminance signal Y is filtered using the filter 40 to obtain Y', and the color difference signals C1 and C2 are edited by calculating:

$$C1'=K\times C1$$

$$C2'=K\times C2$$

where K is a constant corresponding to the brightness level designated by the user. For example, when the standard brightness level is set, K=2; when a brighter mode is selected, K=3, 4, . . . may be set. K is not limited to an integer.

The obtained Y', C1', and C2' are re-converted into R, G, and B values, thus completing the simulate illustration process of the third embodiment.

Measure Against Rasterized Image

However, the aforementioned problem is posed. That is, since the serial printer performs so-called rasterization unlike application software that can batch-process a single image, an image is segmented and processed and, hence, a 5×5 filter process may be disabled.

Figure 15:
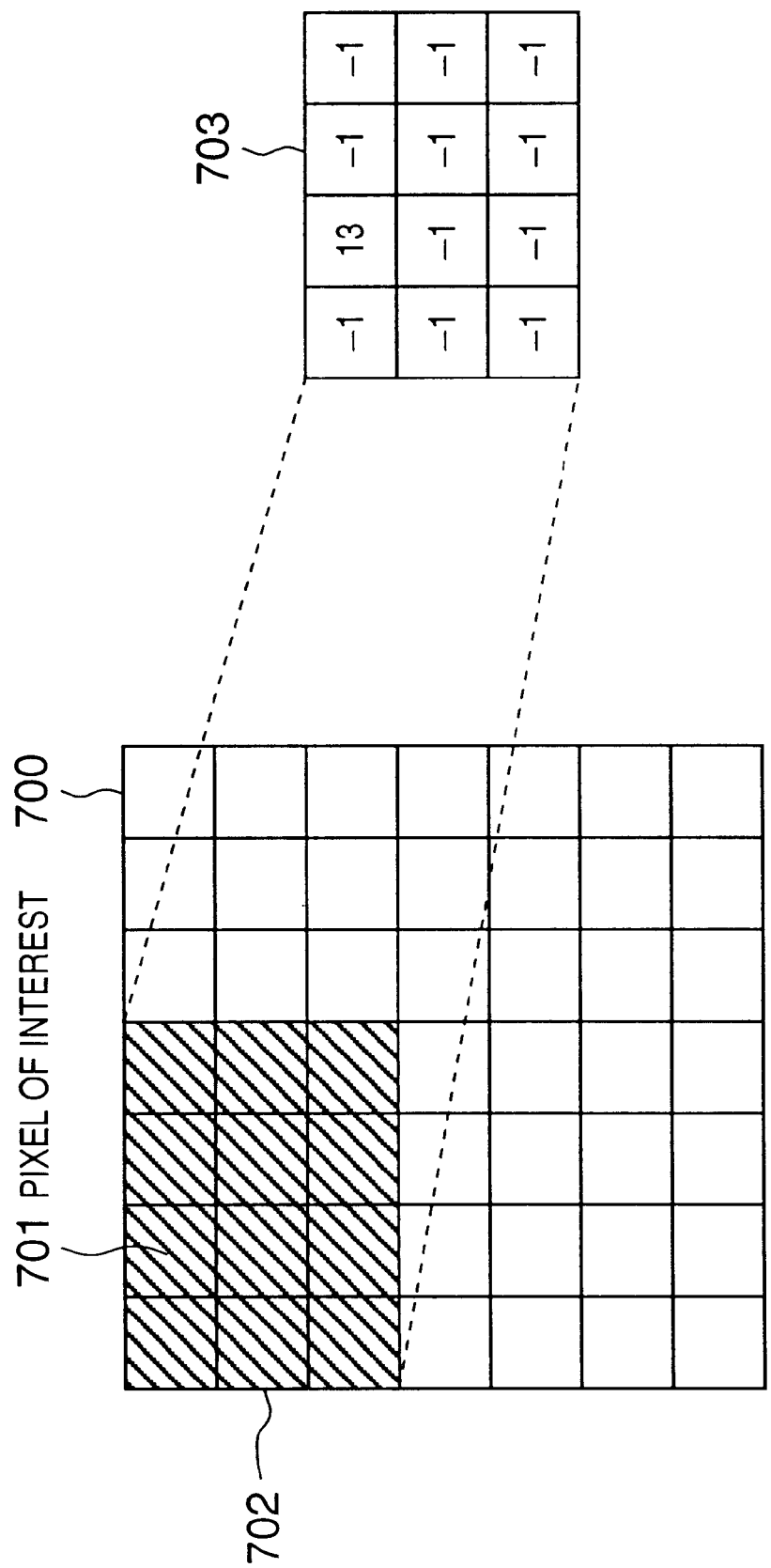
FIG. 15 shows an example of a filter process for an image edge upon batch-processing an image.

Even when an image can be batch-processed, the upper, lower, right, and left end regions of an image cannot undergo the 5×5 filter process. A case will be exemplified below with reference to FIG. 15 wherein the 5×5 filter process is disabled. Referring to FIG. 15, reference numeral 700 denotes an image to be processed, in which one rectangle indicates one pixel. Assuming that a pixel 701 of interest located in the upper left region of the image 700 is to be processed, it cannot undergo, e.g., a 5×5 filter process. Therefore, the image quality of this region becomes different from that of other regions that can undergo the 5×5 filter process. Such problem occurs in any filter processes. However, since this problem normally occurs only in end portions of an image, it is not visually conspicuous, and is not so serious.

When such pixel 701 of interest is to be processed, a method of adjusting the coefficient of the pixel 701 of interest in accordance with the number of pixels (to be referred to as effective pixels hereinafter) which are located with a region 702 near the pixel of interest and allow 5×5 filtering is effective. More specifically, as a special filter for the pixel 701 of interest, if an output with a standard brightness level is required, a filter having a sum total of coefficients="2" can be generated complying with a rule that the sum total of filter coefficients is positive, and can be used in filtering for the region 702. Reference numeral 703 denotes an example of such special filter.

In any case, when an image is batch-processed, a filter process can be done based on three or more lines or columns of pixels. In addition, since a special filter process is done for only image end portions, the filter process, i.e., the simulate illustration process can be completed hardly forming any visually unnatural regions. It is empirically known that hardly any visually unnatural region is formed as a result of a filter process for three or more lines or columns of effective pixels.

On the other hand, when image data is rasterized like in the printer driver, image data for a plurality of lines (e.g., three lines or more) are not always assured as a segmented processing unit. Also, since a single image is processed in units of a plurality of regions, if different filters are used every processing units, image quality differences become conspicuous at the boundary lines of regions.

Figure 16B:
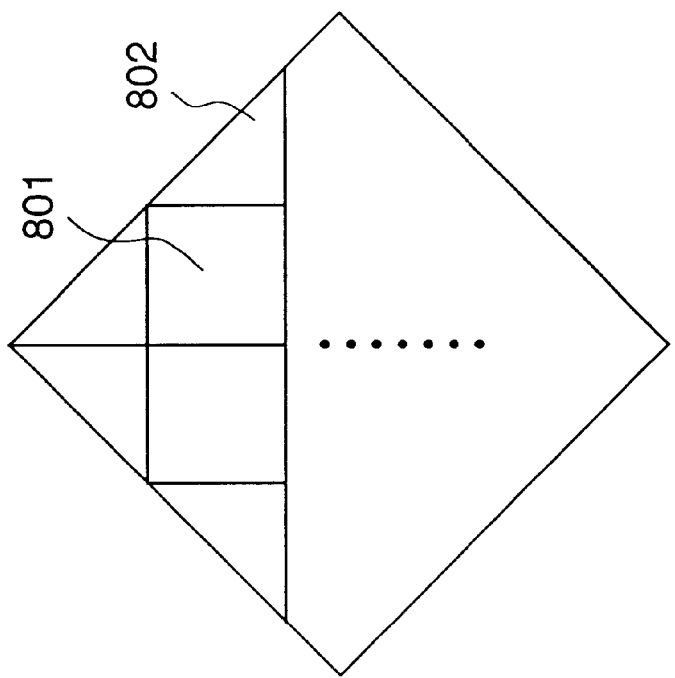
FIGS. 16A and 16B show an example of area segmentation upon obliquely setting an image.
Figure 16A:
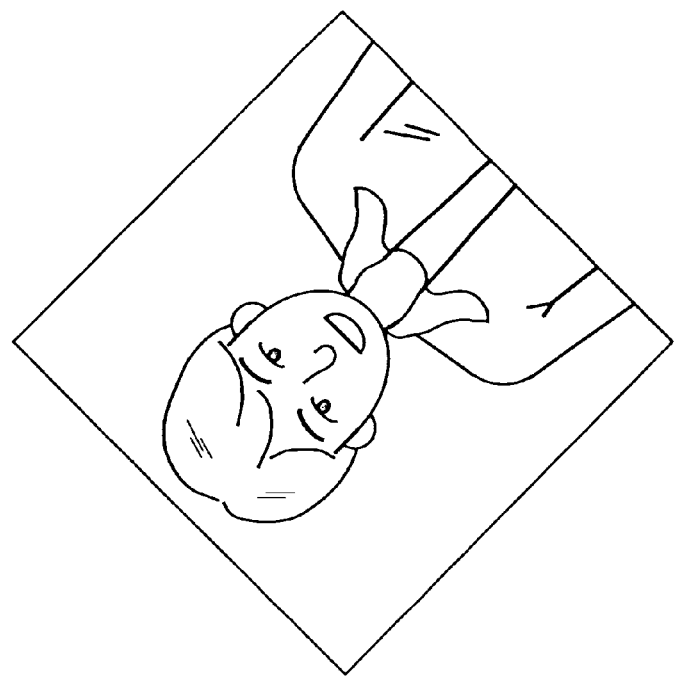

In an extreme case, for example, when an image is obliquely set, as shown in FIG. 16A, the image is segmented into regions, as shown in FIG. 16B. In this case, a region 801 that can assure a rectangular region can undergo a normal filter process for a plurality of lines, but a non-rectangular region 802 must undergo a filter process in units of lines in the worst case. Consequently, processing result differences become noticeable in units of regions. Such problem is similarly posed when an image is deformed into a special shape, e.g., a heart shape.

Since the principle of the simulate illustration process in the present invention is to emphasize the difference between the pixel of interest and its neighboring pixels, a portion having an abrupt change between pixels, i.e., an edge portion is emphasized. That is, since the essence of the present invention is to more emphasize the difference the pixel of interest and its surrounding pixels, the aforementioned shortcomings can be eliminated by adjusting the coefficients in correspondence with the filter size that can be formed.

Figure 17:
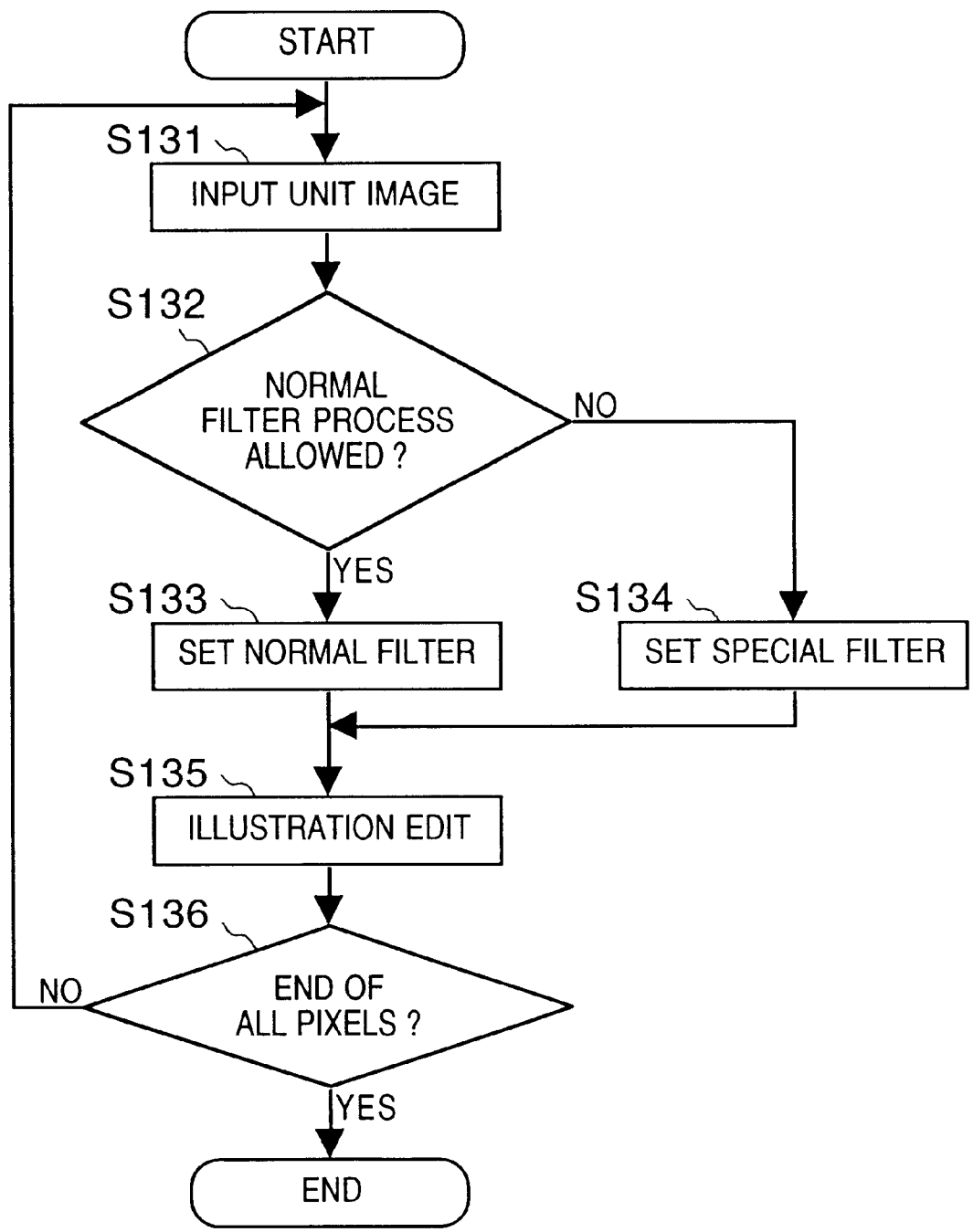
FIG. 17 is a flow chart showing a simulate illustration process according to the third embodiment of the present invention.

FIG. 17 is a flow chart showing the simulate illustration process for rasterized image data in the third embodiment.

Image data for one or a plurality of lines, which has been segmented into a given processing unit by rasterization, is input (S131). A filter is set in correspondence with the number of lines of that image data as the processing unit.

It is checked if the number of lines that form the data to be processed allows a normal filter process (S132). If the normal filter process cannot be done, the flow advances to step S134 to set a special filter. For example, when the data to be processed consists of one line (or one column), a special filter shown in FIG. 18A is used; when the data to be processed consists of two lines (or two columns), a special filter shown in FIG. 18B is used. A coefficient P of the pixel of interest in each of the special filters shown in FIGS. 18A and 18B can be set in correspondence with the brightness of an image that the user desires as an edit result. That is, when standard brightness is required, the filter is set so that the sum total of the coefficients is "2". Even when the image data to be processed consists of one column of pixels in place of one row of them, such filter can be used.

On the other hand, if the number of lines that form the image data to be processed allows the normal filter process, a normal filter (5×5 filter in this embodiment) is set in step S133.

In step S135, the data to be processed is filtered on the basis of the filter set in step S133 or S134, thus implementing simulate illustration process in the third embodiment. The processes in steps S131 to S135 are repeated until it is determined in step S136 that the simulate illustration process is complete for all the lines of image data.

Note that the special filters in the third embodiment are not limited to the examples shown in FIGS. 18A and 18B, but may have any other p×q sizes (p and q are integers equal to or larger than 1).

As can be seen from FIGS. 18A and 18B, surrounding pixels other than the pixel of interest are set to have larger coefficients with decreasing special filter size. The coefficient of the pixel of interest is determined based on those coefficients of the surrounding pixels.

Note that the coefficients of the surrounding pixel in the special filter are preferably set to be the powers of 2. In this manner, shift operations are allowed, thus expecting a light arithmetic load and a short processing time.

Note that the number of "effective pixels" may become short even for image data having a number of lines that allow the normal filter process. In such case, by similarly applying the aforementioned principle, any problems on the boundary lines of segmented regions can be avoided.

As larger coefficients are set, features (edges) stand out more accordingly. However, since an optimal degree of emphasis depends on balance with a filter used in the normal process, weights are preferably finally adjusted with reference to the output result. For example, the coefficients are preferably changed in correspondence with the number of effective pixels and their distances from the pixel of interest.

As described above, according to the third embodiment, when the filter coefficients are adjusted in correspondence with the number of lines that can be processed at the same time even for image data to be rasterized, a natural, continuous image processing result at boundaries of processing regions can be obtained. Hence, even when an image is placed obliquely, or is deformed into an arbitrary shape, it can undergo appropriate simulate illustration process.

The third embodiment has explained the method of converting RGB information of an image into luminance/color difference information, filtering only the luminance information, and multiplying color difference components by a constant on the basis of the required brightness. Of course, RGB information itself or image data in other formats may be filtered.

For example, original image data having a format other than the RGB format may be tentatively converted into the RGB format, and the individual color components may undergo the simulate illustration process of this embodiment, or the original image data itself may undergo a filter process according to its data format. For example, when original image data has the YMC format, the signs of all filter coefficients used in the third embodiment may be inverted.

Furthermore, the third embodiment can be applied to original image data having the YHS format, L*a*b* format, and the like. That is, in such formats, since a luminance component can be easily extracted from an original image, only the luminance component can undergo the filter process, thus reducing the computation volume compared to filter processes in units of components of the RGB format. Especially, this effect becomes higher with increasing filter size.

Fourth Embodiment

The fourth embodiment of the present invention will be described below. Since the system arrangement in the fourth embodiment is the same as that in the first embodiment, a detailed description thereof will be omitted.

Contrary to the need for higher-definition color image processes that pursue reality of photo images, the need for a monochrome edit process represented by a sepia tone process is still high. The monochrome edit process itself has prevailed. When an image that has undergone simulate illustration process by the filter process described in the first to third embodiments further undergoes monochrome edit, a unique image like a sketch by means of monochrome crayon can be provided.

In the fourth embodiment, the user can set an arbitrary hue upon designating the monochrome edit, and when the user also designates simulate illustration process, the simulate illustration process is done prior to the monochrome edit.

For example, the user sets desired image processes using a user interface (to be abbreviated as a UI hereinafter) shown in FIGS. 19A to 19C, and can preview the processing result.

FIG. 19A shows a default window of the image process setup UI. After the user checks a check box of "Simulate illustration", as shown in FIG. 19B, he or she can adjust a "Contrast" adjustment lever for setting contrast (brightness). In accordance with the adjusted position of this lever, a preview image that has undergone simulate illustration process is displayed.

Figure 19C:
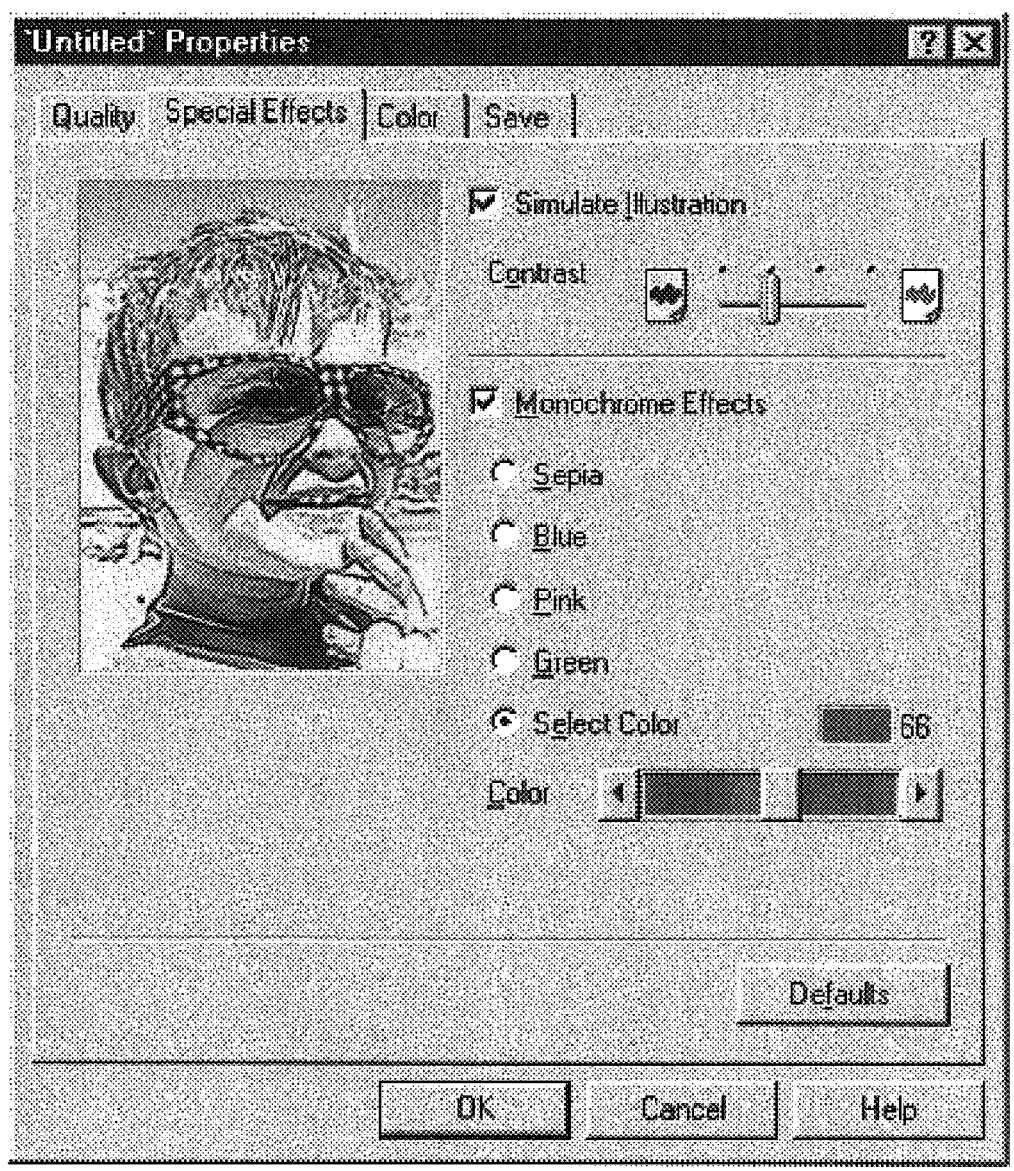

FIG. 19C shows an UI example set with "Monochrome Effects", i.e., the monochrome edit, after the "Simulate illustration" process shown in FIG. 19B. In the fourth embodiment, upon setting the monochrome edit, the user can select a hue such as sepia or the like which is popularly used, and can also designate an arbitrary hue other than popular ones from the entire hue range using a color bar. Of course, by selecting only "Monochrome Effects", the monochrome edit using achromatic color can be done. According to FIG. 19C, yellowish green is set as user designated color, and a preview image after the monochrome edit using that designated color is displayed.

When the user is satisfied with the preview image on the UI, he or she selects an "OK" button to close the detail setup window of the image process, and the setup contents are held in a RAM (not shown) or the like in a printer driver. In this manner, upon executing the image process, an image that has undergone the edit process the user desires can be obtained on the basis of the held setup contents.

Figure 20D:
FIG. 20D shows an example of an illustration edit & monochrome edit result of the original image shown in FIG. 20A.

As has been explained in the third embodiment, when the simulate illustration process is done in units of luminance/ color difference signals, the color difference signals are set in an arbitrary hue, thus allowing easy and quick monochrome edit. For example, when an original image shown in FIG. 20A undergoes the simulate illustration process and the monochrome edit process using sepia, a unique image shown in FIG. 20D can be obtained.

As described above, according to the fourth embodiment, since photo image data can undergo the monochrome edit process using an arbitrary hue in addition to the simulate illustration process, even the user who has poor knowledge about image processes can easily obtain an image that has undergone desired processes including many patterns, unique image process effects, and the like.

Hence, a photo image can undergo an edit process in higher degree of freedom, and an image with higher originality can be easily created.

In the fourth embodiment, a single image undergoes the simulate illustration and monochrome edit processes as setups of the image processes. Of course, other image processes may be simultaneously executed. For example, by setting the roughness of the edited image using the UI, arbitrary resolution conversion can be achieved.

Other Embodiments

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

The present invention includes a product, e.g., a printout, obtained by the image processing method of the present invention.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts (FIGS. 3, 4, 8, 9, 13, 14 and 17) described in the embodiments.

In addition to JPEG used in the present invention, various other methods (for example, a method called scale index coding) can be used as block coding.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:
modifying a first image to obtain a second image on the basis of a first signal and a second signal, wherein said first signal is obtained by extracting an edge of the first image, said edge having a thickness according to an attribute of the entire first image, and wherein said second signal is obtained by reducing a number of tone levels.

2. The method according to claim 1, wherein the second signal is a signal processed by decreasing the number of tone levels of the first image and increasing brightness.

3. The method according to claim 1, which includes the step of simultaneously generating the first and second signals as the second image.

4. The method according to claim 3, which includes the step of generating the first and second signals by filtering the first image using a predetermined filter.

5. The method according to claim 4, wherein the predetermined filter has coefficients, a sum total of which is positive.

6. The method according to claim 5, wherein the predetermined filter has a pixel of interest having a positive coefficient, and all other pixels having negative coefficients.

7. The method according to claim 4, wherein the predetermined filter is defined by that some of the coefficients of the predetermined filter, for pixels other than a coefficient of a pixel of interest are "0".

8. The method according to claim 4, which includes the step of setting the filter on the basis of brightness of the first image.

9. The method according to claim 8, which includes the step of setting a larger sum total of coefficients in the filter as the first image is darker.

10. The method according to claim 9, further comprising a luminance distribution calculation step of calculating a luminance distribution of the first image, and
which includes the step of detecting brightness of the first image on the basis of the luminance distribution.

11. The method according to claim 10, which includes the step of detecting brightness of the first image on the basis of an average luminance of the first image.

12. The method according to claim 10, wherein the luminance distribution calculation step includes the step of generating a luminance histogram of the first image.

13. The method according to claim 12, which includes the step of detecting brightness of the first image on the basis of a median of a luminance histogram.

14. The method according to claim 12, which includes the step of detecting brightness of the first image on the basis of a maximum frequency value of the luminance histogram.

15. The method according to claim 10, further comprising a correction step of correcting the first image on the basis of the luminance distribution, and
which includes the step of setting the filter on the basis of a correction condition generated in the correction step.

16. The method according to claim 4, which includes the step of modifying the first image in units of blocks each consisting of a predetermined number of lines, and controlling a size of the filter in accordance with an object line position for modifying in the block.

17. The method according to claim 1, wherein the attribute of the entire first image is an image size.

18. The method according to claim 1, wherein the attribute of the entire first image is an image resolution.

19. The method according to claim 1, wherein the attribute of the entire first image is manually set.

20. The method according to claim 1, further comprising:
a segmentation step of segmenting the first image into a plurality of regions; and
a setting step of setting processing contents of each of the segmented regions, and
wherein the modifying includes the first image in units of regions to obtain the second image.

21. The method according to claim 20, wherein the segmentation step includes the step of obtaining a plurality of regions by generating the first image in units of regions.

22. The method according to claim 20, wherein the setting step includes the step of setting filters in units of regions, and
the modifying includes the step of generating the first and second signals by executing a filter process using filters set in units of regions.

23. The method according to claim 22, wherein the setting step includes the step of setting a filter in correspondence with a size of the region.

24. The method according to claim 23, wherein the setting step includes the step of setting a filter in correspondence with a number of lines in the region.

25. The method according to claim 22, wherein the filter set in the setting step includes a filter having different line and column sizes.

26. The method according to claim 22, wherein the setting step includes the step of setting coefficients of the filters for each region.

27. The method according to claim 22, wherein the setting step includes the step of setting a predetermined filter for a region having a size not less than a predetermined size.

28. An image processing method comprising:
modifying a first image to obtain a second image on the basis of a first signal and a second signal, wherein said first signal is obtained by extracting an edge of the first image, said edge having a thickness according to an attribute of the entire first image, and wherein said second signal is obtained by reducing a number of tone levels, and
a decoding step of decoding the first image if the first image is block-encoded.

29. The method according to claim 28, which includes the step of modifying the first image decoded in the decoding step to obtain the second image after the first image is smoothed.

30. An image processing method comprising:
modifying a first image to obtain a second image on the basis of a first signal and a second signal, wherein said first signal is obtained by extracting an edge of the first image, said edge having a thickness according to an attribute of the entire first image, and wherein said second signal is obtained by reducing a number of tone levels, which includes the steps of tentatively block-encoding and decoding the first image when the first image is not a block-encoded image, and then modifying the first image to obtain the second image.

31. An image processing method comprising:
modifying a first image to obtain a second image on the basis of a first signal and a second signal, wherein said first signal is obtained by extracting an edge of the first image, said edge having a thickness according to an attribute of the entire first image, and wherein said second signal is obtained by reducing a number of tone levels;
an instruction input step for inputting a user instruction that selects a desired one of a plurality of modify modes; and
an image process step for executing an image process for image data using the modify mode corresponding to the user instruction,
wherein the plurality of modify modes include an illustration mode for converting the first image into the second image in the modify step, and wherein the instruction input step includes the step of selecting the first image from a plurality of images, selecting the illustration mode as the modify mode for the first image, and setting detailed modify contents in the illustration mode.

32. The method according to claim 31, which includes the step of setting a filter on the basis of the detailed setup contents in the instruction input step, and generating the first and second signals by a filter process using the filter.

33. The method according to claim 32, wherein the detailed setup contents include setups of brightness of the modified image.

34. The method according to claim 31, wherein the detailed setup contents include setups as to whether or not the modified image is grained.

35. The method according to claim 34, wherein when the detailed setup contents are set with grainy conversion of the modified image, the first image is controlled to have block distortion.

36. The method according to claim 35, wherein when the detailed setup contents are set with grainy conversion of the modified image, the first image is controlled to be a JPEG-encoded image.

37. An image processing method comprising:
modifying a first image to obtain a second image on the basis of a first signal obtained by extracting an edge of the first image, and a second signal obtained by reducing a number of tone levels;
an instruction input step for inputting a user instruction that selects a desired one of a plurality of modify modes;
an image process step of executing an image process for image data using a modify mode corresponding to the user instruction, wherein the plurality of modify modes include a illustration mode for converting the first image into the second image in the modify step, and wherein the plurality of modify modes further include a monochrome effect mode for converting the first image into a monochrome image, and wherein the image process step includes the step of executing the illustration mode for converting the first image into the second image and then executing the monochrome effect mode for converting the second image into a monochrome image when the user instruction designates both the illustration mode and the monochrome effect mode.

38. The method according to claim 37, wherein the illustration mode includes the step of converting a luminance and a color difference signal of the first image, and
the monochrome effect mode includes the step of converting the color difference signals of the second image.

39. An image processing method comprising:
modifying a first image to obtain a second image on the basis of a first signal obtained by extracting an edge of the first image, and a second signal obtained by reducing a number of tone levels;
an instruction input step for inputting a user instruction that selects a desired one of a plurality of modify modes;

an image process step of executing an image process for image data using the modify mode corresponding to the user instruction, wherein the plurality of modify modes include an illustration mode for converting the first image into the second image in the modify step, and wherein the plurality of modify modes further include a monochrome effect mode for converting the first image into a monochrome image, and wherein the instruction input step allows to set a hue in the monochrome effect mode.

40. An image processing method comprising:

a modify step that modifies a first image to obtain a second image on the basis of a first signal obtained by extracting an edge of the first image, and a second signal obtained by reducing a number of tone levels;

a segmentation step for segmenting the first image into a plurality of regions; and a setting step for setting processing contents of each of the plurality of regions, wherein the setting step includes the step of setting filters in units of regions, and wherein the modify step includes the steps of modifying the first image in units of regions to obtain the second image, and further includes the modify step of generating the first and second signals by executing a filter process using the filters set in units of regions, and wherein the setting step further includes the step of setting the filter on the basis of a user instruction.

41. An image processing apparatus comprising:

input means for inputting a first image;

modify means for modifying a first image to obtain a second image on the basis of a first signal obtained by extracting an edge of the first image, and a second signal obtained by reducing the number of tone levels;

wherein the first signal is a signal obtained by extracting an edge having a thickness according to an attribute of the entire first image, and output means for outputting the second image.

42. The apparatus according to claim 41, wherein said modify means obtains the second image by filtering the first image using a predetermined filter.

43. The apparatus according to claim 41, further comprising:

segmentation means for segmenting the first image into a plurality of regions; and setting means for setting processing contents of each of the plurality of regions, and wherein said modify means modifies the first image in units of regions to obtain the second image.

44. The apparatus according to claim 43, wherein said segmentation means obtains a plurality of regions by generating the first image in units of regions.

45. An image processing apparatus comprising:

input means for inputting a first image;

modify means for modifying a first image to obtain a second image on the basis of a first signal obtained by extracting an edge of the first image, and a second signal obtained by reducing the number of tone levels;

output means for outputting the second image;

instruction input means for inputting a user instruction that selects a desired one of a plurality of modify modes; and image process means for executing an image process for image data using the modify mode corresponding to the user instruction, and wherein the plurality of modify modes include an illustration mode for converting the first image into the second image by said modify means, and wherein the plurality of modify modes further include a monochrome effect mode for converting the first image into a monochrome image, and wherein when the user instruction designates both the illustration mode and the monochrome effect mode, said image process means executes the illustration mode for converting the first image into the second image, and then executes the monochrome effect mode for converting the second image into a monochrome image.

46. An image processing system which connects an image processing apparatus for generating a second image on the basis of a first image, and an image output apparatus for outputting the second image, said image processing apparatus having modify means for modifying the first image to obtain the second image on the basis of a first signal obtained by extracting an edge of the first image, and a second signal obtained by reducing the number of tone levels, wherein the first signal is a signal obtained by extracting an edge having a thickness according to an attribute of the entire first image.

47. The system according to claim 46, wherein said modify means obtains the second image by filtering the first image using a predetermined filter.

48. The system according to claim 47, wherein said modify means executes different filter processes in units of regions of the first image.

49. An image processing system which connects an image processing apparatus for generating a second image on the basis of a first image, and an image output apparatus for outputting the second image, said image processing apparatus having modify means for modifying the first image to obtain the second image on the basis of a first signal obtained by extracting an edge of the first image, and a second signal obtained by reducing the number of tone levels;

instruction input means for inputting a user instruction that selects a desired one of a plurality of modify modes;

image process means for executing an image process for image data using the modify mode corresponding to the user instruction, and wherein the plurality of modify modes include an illustration mode for converting the first image into the second image, and wherein the plurality of modify modes further include a monochrome effect mode for converting the first image into a monochrome image, and when the user instruction designates both the illustration mode and the monochrome effect mode, said image process apparatus executes the illustration mode for converting the first image into the second image, and then executes the monochrome effect mode for converting the second image into a monochrome image.

50. Storage medium storing a program code of an image process, said program code including at least:

code of a modify step for modifying a first image to obtain a second image on the basis of a first signal obtained by extracting an edge of the first image, and a second signal obtained by reducing the number of tone levels wherein the first signal is a signal obtained by extracting an edge having a thickness according to an attribute of the entire first image.

* * * * *

UNITED STATES PATENT AND TRADEMARK OFFICE
CERTIFICATE OF CORRECTION

| | | |
|---|---|---|
| PATENT NO. | : 7,038,810 B1 | |
| APPLICATION NO. | : 09/459479 | |
| DATED | : May 2, 2006 | |
| INVENTOR(S) | : Manabu Yamazoe et al. | |

It is certified that error appears in the above-identified patent and that said Letters Patent is hereby corrected as shown below:

COLUMN 1:

Line 66, "According" should read --According to--.

COLUMN 2:

Line 9, "According" should read --According to--; and
    Line 22, "According" should read --According to--.

COLUMNS 5:

Line 19, "FIG. 4" should read -- ¶ FIG. 4--.

COLUMN 11:

Line 23, "is" should read --is a--; and
    Line 62, "is" should read --is a--.

COLUMN 15:

Line 15, "conversion" should read --conversions--.

COLUMN 16:

Line 55, "difference" should read --difference in--.

COLUMN 22:

Line 43, "a" should read --an--.

UNITED STATES PATENT AND TRADEMARK OFFICE
CERTIFICATE OF CORRECTION

| | | |
|---|---|---|
| PATENT NO. | : 7,038,810 B1 | |
| APPLICATION NO. | : 09/459479 | |
| DATED | : May 2, 2006 | |
| INVENTOR(S) | : Manabu Yamazoe et al. | |

It is certified that error appears in the above-identified patent and that said Letters Patent is hereby corrected as shown below:

<u>COLUMN 24</u>:

Line 62, "levels" should read --levels,--.

Signed and Sealed this

Twelfth Day of December, 2006

JON W. DUDAS
*Director of the United States Patent and Trademark Office*